Dec. 1, 1964

D. E. RICHARDSON 3,159,718

METHOD AND APPARATUS FOR ELECTROSTATIC RECORDING AND REPRODUCING

Filed Oct. 5, 1959

10 Sheets-Sheet 1

Inventor
Donald E. Richardson by Hill, Sherman, Meroni, Gross & Simpson Attys

Inventor
Donald E. Richardson

By Hill, Sherman, Meroni, Gross & Simpson Attys.

Inventor
Donald E. Richardson
By Hill, Sherman, Meroni, Gross & Simpson Attys.

Inventor
Donald E. Richardson
by Hill, Sherman, Meroni, Gross & Simpson Attys

Dec. 1, 1964 D. E. RICHARDSON 3,159,718

METHOD AND APPARATUS FOR ELECTROSTATIC RECORDING AND REPRODUCING

Filed Oct. 5, 1959 10 Sheets-Sheet 5

Inventor
Donald E. Richardson

By Hill, Sherman, Meroni, Gross & Simpson Attys.

Inventor
Donald E. Richardson
by Hill, Sherman, Meroni, Gross & Simpson Attys

Inventor
Donald E. Richardson
by Hill, Sherman, Meroni, Gross & Simpson Attys

ELECTRODE CURRENT PLOTTED AGAINST ELECTRODE VOLTAGE FOR 1/4, 1/2, AND 1 MIL MYLAR—A TAPES. SPEED 15 INCHES PER SECOND.

DIAGRAM OF CONNECTIONS FOR MEASURING THE MOTIONAL INJECTION AND EJECTION CURRENTS OF MYLAR TAPE

INVENTOR
DONALD E. RICHARDSON
BY Anderson, Luedeka, Fitch, Even & Tabin
ATTORNEYS ELECTRODE CURRENT VOLTAGE CHARACTERISTICS FOR WITH AND WITHOUT AN APPLIED PREBIAS VOLTAGE.

INVENTOR
DONALD E. RICHARDSON

BY Anderson, Luedeka, Fitch, Even & Tabin
ATTORNEYS

FIG. 30.
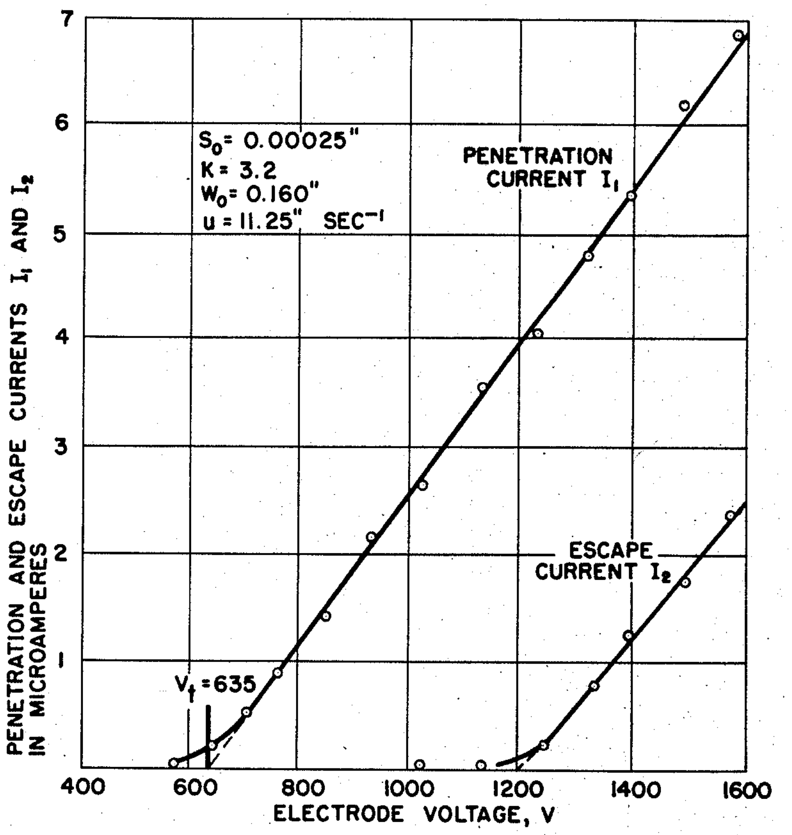
MOTIONAL CURRENT-VOLTAGE CURVES FOR MYLAR TAPE
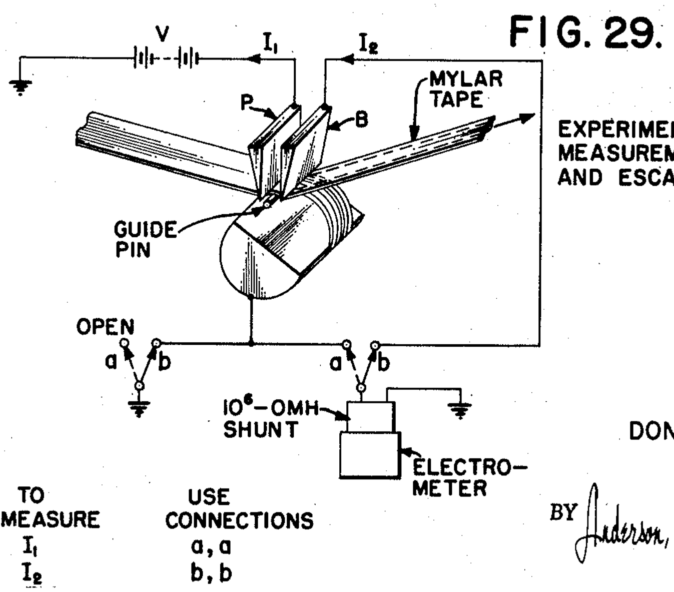
EXPERIMENTAL ARRANGEMENT FOR MEASUREMENTS OF PENETRATION AND ESCAPE CURRENTS, $I_1$ AND $I_2$
| TO MEASURE | USE CONNECTIONS |
| --- | --- |
| $I_1$ | a, a |
| $I_2$ | b, b |
INVENTOR
DONALD E. RICHARDSON
BY Anderson, Luedeka, Fitch, Even & Tabin
ATTORNEYS

United States Patent Office 3,159,718
Patented Dec. 1, 1964

3,159,718

METHOD AND APPARATUS FOR ELECTROSTATIC RECORDING AND REPRODUCING

Donald E. Richardson, Chicago, Ill., assignor to IIT Research Institute, a corporation of Illinois Filed Oct. 5, 1959, Ser. No. 844,472
63 Claims. (Cl. 179—100.1)

This invention relates to a novel recording system and method and particularly to a recording system utilizing a novel electrical recording mechanism herein termed "charge injection."

The charge injection system herein disclosed readily provides an adequate fidelity for the recording and reproduction of voice and music signals, and constitutes a recording system of general application.

Prior art ferroelectric recording systems rely no polarization of the charge in the record medium with no significant change in the net internal charge of the record. In the present invention, charges are actually injected into the record medium to alter the net charge in minute subsurface regions of the medium. The charge cannot be erased by wiping the surface of the record as is the case with surface charge recording; however, erasure of an injected charge signal may be accomplished for example by application of a high intensity electric erasing field. After erasure, the record medium may be reused in a manner analogous to the reuse of a magnetic recording medium. A fundamental advantage of the present recording system over magnetic recording resides in the inherently higher playback levels obtainable with charge injection recording.

It is found experimentally that as a dielectric record medium travels between a pair of electrodes, and the voltage between the electrodes is increased in steps, a threshold value of voltage is reached beyond which current flow in the electrode circuit begins to increase rapidly, At values of voltage above the threshold value, and below dielectric breakdown there is a steady current of substantial magnitude which continues so long as the record medium continues to move past the electrodes. Below the threshold voltage, the observed electrode current is negligible; however, at voltages above this threshold voltage a substantial current flows which is substantially linearly proportional to electrode voltage. When a signal is recorded on the record medium by means of electrode configurations as herein disclosed in conjunction with an electric field above the threshold value, it is found that the record medium receives a charge pattern which cannot be removed by wiping the surface of the record medium. Further, the signal can be played back repeatedly by moving the record medium between contacting metal electrodes without destroying the recorded signal. In fact, it is found that treating the surface of the record medium with ions of polarity to neutralize surface charge on the record medium actually improves playback of a signal recorded by charge injection.

Further experiments reveal that if the record medium first travels between a pair of electrodes having a steady bias voltage above the threshold value, and then travels between the same or similar electrodes with a voltage of opposite polarity, current flow in the electrode circuit will begin to increase rapidly at much lower values of voltage during the second passage of the record medium between the electrodes. Thus by first subjecting the record medium to a prebias voltage, the effective recording threshold voltage is greatly reduced. It is found that such a prebias voltage will erase a previous charge injection signal on the record medium as well as condition the record medium to receive a new signal. Recordings which are produced by first prebiasing the record medium are found to be of better quality than those produced without prebias.

The present preferred system of electrostatic recording employs a polyester tape one-fourth inch wide and one-fourth mil thick drawn between two tandem close-spaced knife-edge electrodes having a common flexible backing electrode consisting of numerous small parallel resilient wires of small diameter, e.g. 0.001″. A high direct current bias potential is applied to the two knife-edges of such a value that while the tape is in motion, the total bias voltage will divide automatically in the approximate ratio of 1.5 to 1 between the first, earliest, or "prebias" knife-edge to backing electrode and the second, latest, or "recording" knife-edge to backing electrode. For this voltage division the voltage of the tape in transit between the two knife-edges approximately equals one-half of the tape threshold voltage, where, by threshold voltage is meant the voltage that must be applied across moving virgin tape before any appreciable motional current results in the external circuit connected with the electrodes.

The common backing electrode is isolated by a small blocking or bypass capacitor which connects to ground. Hence, since the two-knife-edges are in direct current series through two series of thicknesses of tape, the motional direct bias current of the tape is identically the same under each knife-edge but oppositely directed through it. This causes the tape to emerge from the recording head in a substantially uncharged condition in the absence of a signal. Signal voltage is applied only to the second or recording knife-edge and the path of the resulting alternating current signal is through the blocking or bypass capacitor of the backing electrode and not through the first or prebias knife-edge. Hence, the signal current modulates the direct bias current of the recording knife-edge only and the tape emerges from the recording head with dipole type of internal electrification that is proportional to signal. Ion treatment of the charged tape is found to greatly enhance the permanence of the recording and to preserve a high signal-to-noise ratio.

For playback, a load resistor is connected to the back electrode and to one of the knife-edge electrodes. The voltage that is generated across this resistor by electrostatic induction as the tape is drawn between the knife-edge and the backing electrode is then suitably amplified for operating into a speaker or other device.

It is a characteristic of the polyester tape record medium that it has a certain amount of background noise when the tape is in the condition in which it is received from the manufacturer thereof, prior to its first use. We have found that the background noise level in tape may be reduced by subjecting the tape to one or more of the novel method steps disclosed herein.

It is therefore an important object of the present invention to provide a novel and improved recording system and method.

It is a further object of the present invention to provide a novel electrostatic record for use in electrostatic playback systems.

It is a further object of the present invention to provide a novel recording system and method where there is an actual and substantial transfer of charge through the surface barried of the record medium.

Another object of the invention is to provide a novel recording system where recording is carried out above the threshold voltage for the electrode-record medium configuration, the configuration being such as to transfer substantially equal quantities of charge of opposite polarity substantially simultaneously to the respective opposite sides of the record medium.

Still another object of the invention is to provide a system and method whereby charges of opposite polarity are transferred to respective opposite sides of a record medium and become intensely and relatively permanently bound to each other, while remaining directly available for repeated electrical reproduction by electrical scanning of the record medium.

A still further object of the present invention is to provide a novel electrostatic record having an injected charge signal capable of repeated electrical reproduction by means of contacting metal electrodes.

It is a further important object of the present invention to provide a novel recording system and method whereby charges are injected at opposite sides of a record medium to provide charge distributions of opposite polarity at the respective opposite sides of the record.

It is another important object of the present invention to provide a novel electrostatic record having injected charge signals of opposite polarity at the respective opposite sides thereof.

It is a more specific object of the present invention to provide a novel recording system wherein the record medium is prebiased by means of an electric field above the threshold value required for substantial charge transfer and then subjected to a recording field.

It is a further more specific object of the invention to provide a novel recording system wherein the record is prebiased by means of an electric field above the threshold value extending in one direction and then subjected to a recording field having a different direction of bias.

A further specific object of the present invention is to provide a recording system wherein the record is erased by means of an erase electric field above the threshold value and then subjected to a recording field.

A still further specific object of the invention is to provide an electrostatic recording system wherein gaseous ions are applied to the surface of the charged record medium to greatly enhance the permanency thereof.

Yet another specific object of the invention is to provide guidance means for the record medium as it passes through the recording head of a charge injection system.

A further important object of the invention resides in the provision of a novel electrostatic record medium which resists signal transfer when wound in a coil or otherwise subjected to the possibility of adjacent spurious electric fields.

Other specific objects of the invention relate to the provision of novel electrode structures and novel recording circuits for electrostatic recording.

It is also a principal object of the present invention to provide a method for reducing the background noise of recording tape.

It is a further object of the present invention to provide a method for processing a record medium electrically for reducing the background noise therein.

Another object of the invention is to provide a combination of steps which individually and jointly reduce the background noise level of a record medium.

Many other advantages, features and objects of the present invention will become manifest to those versed in the art upon making reference to the detailed description and the accompanying sheets of drawings in which preferred structural embodiments, together with variations thereof, incorporating the principles of the present invention, are shown by way of illustrative example.

Figure 1:
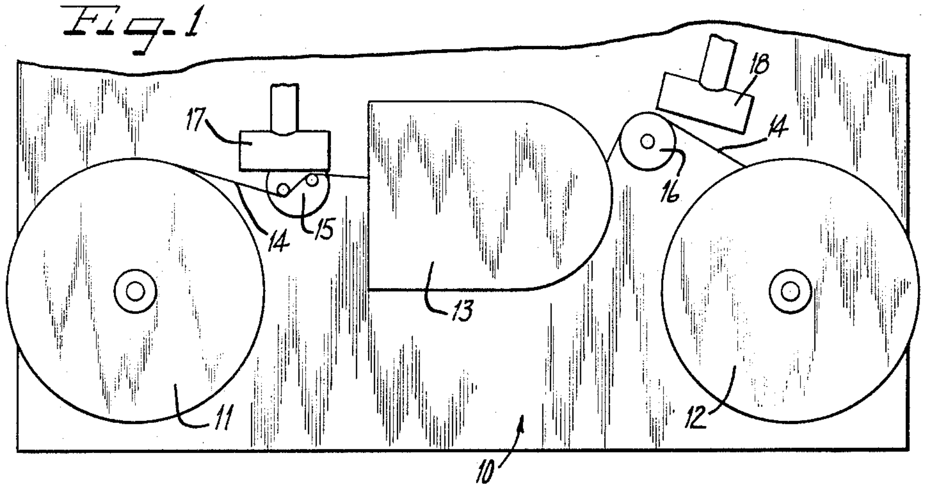
FIGURE 1 is a diagrammatic view of a charge injection recording system.
Figure 3:
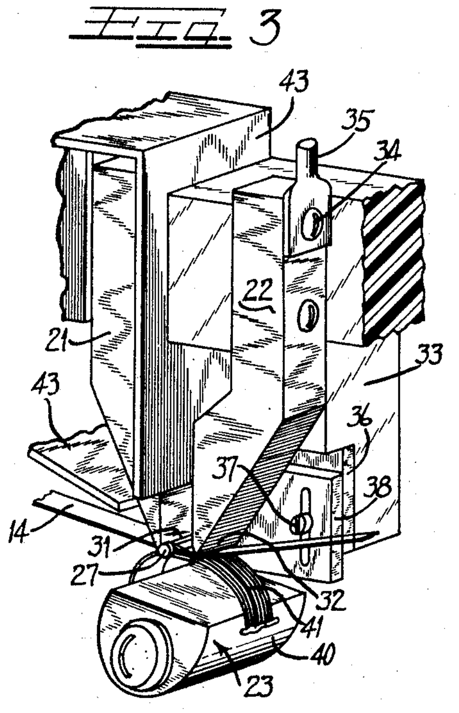
FIGURE 3 is a still further enlarged view of a fragmentary portion of FIGURE 2.
Figure 18:
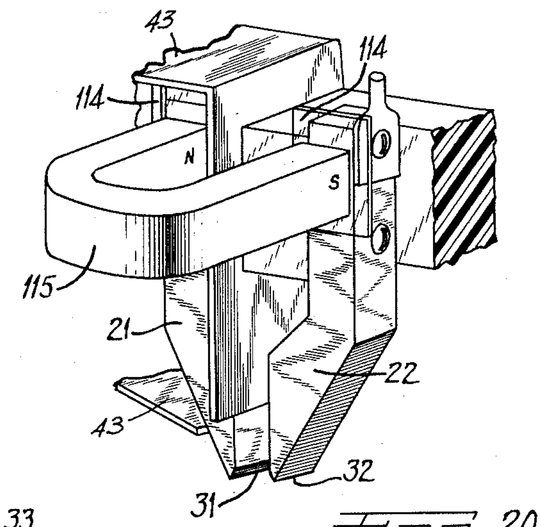
Figure 19:
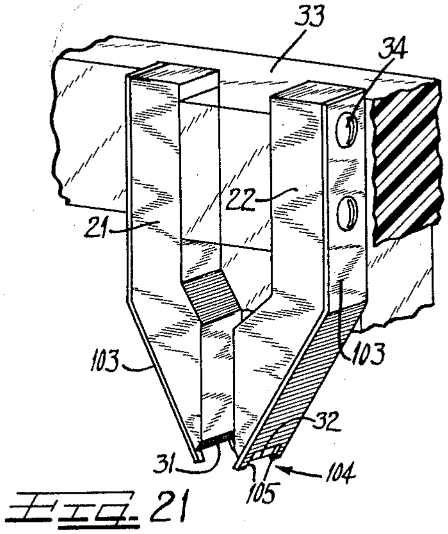
Figure 20:
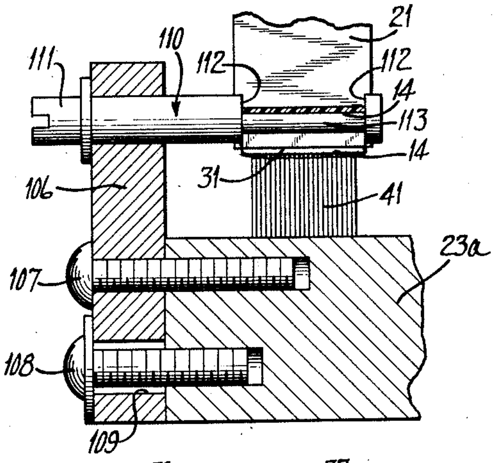
Figure 21:
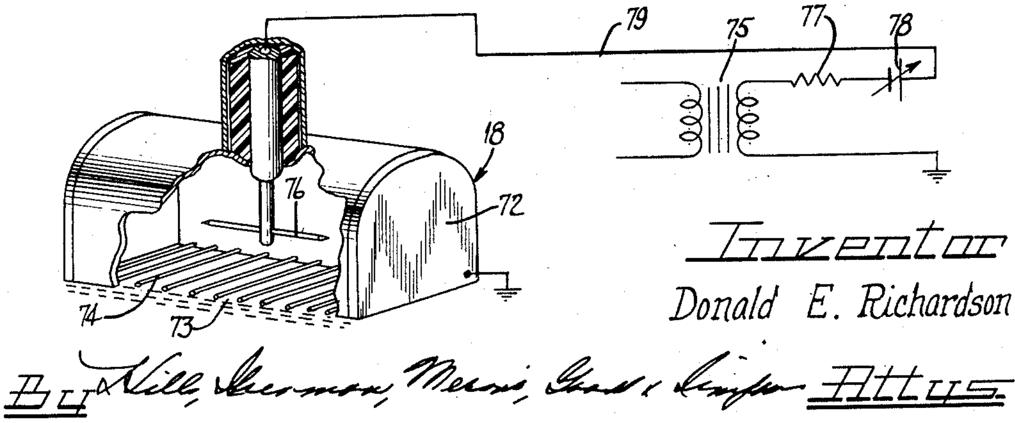
Figure 22:
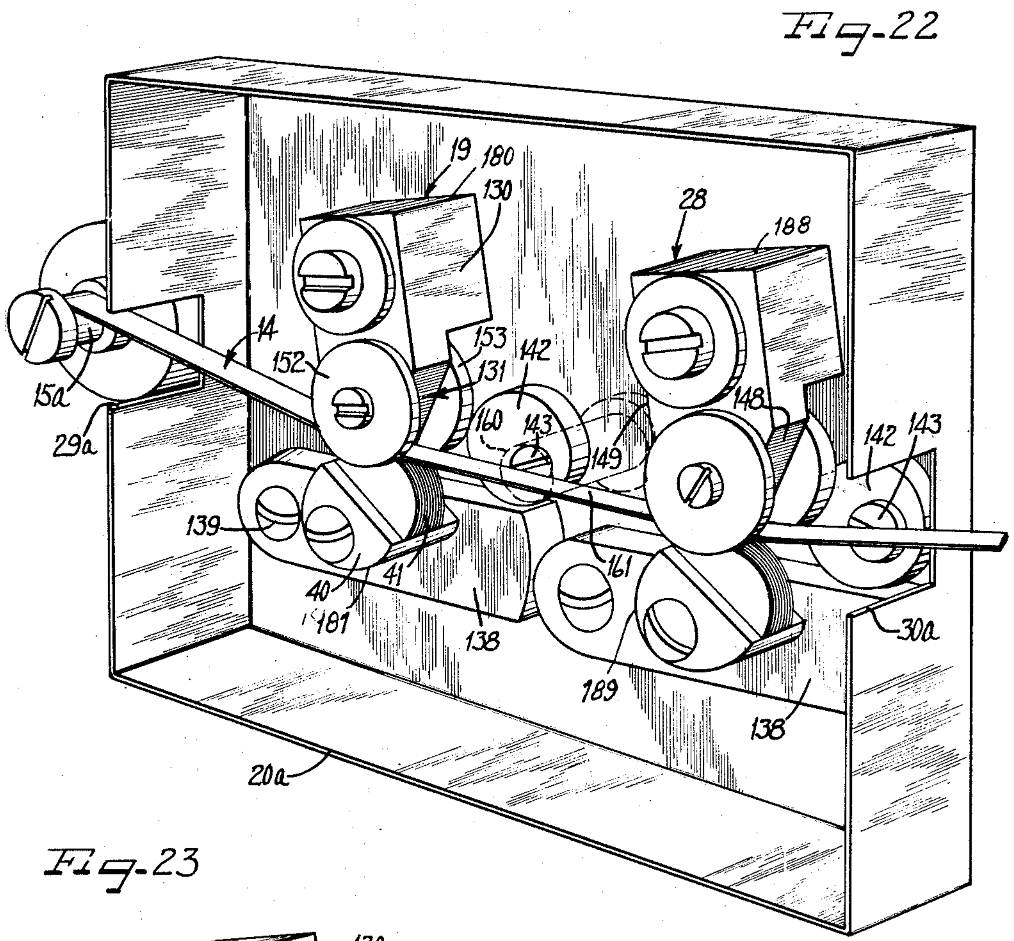
Figure 23:
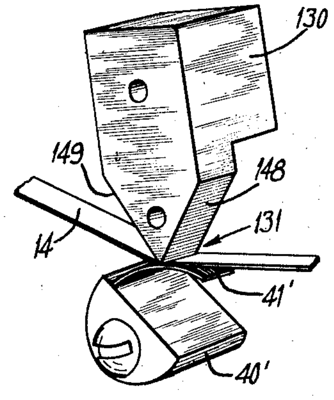
Figure 24:
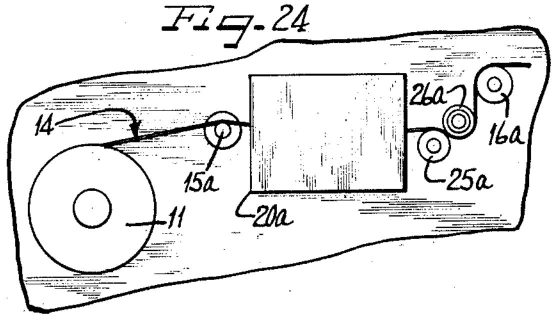
Figures 25, 26:
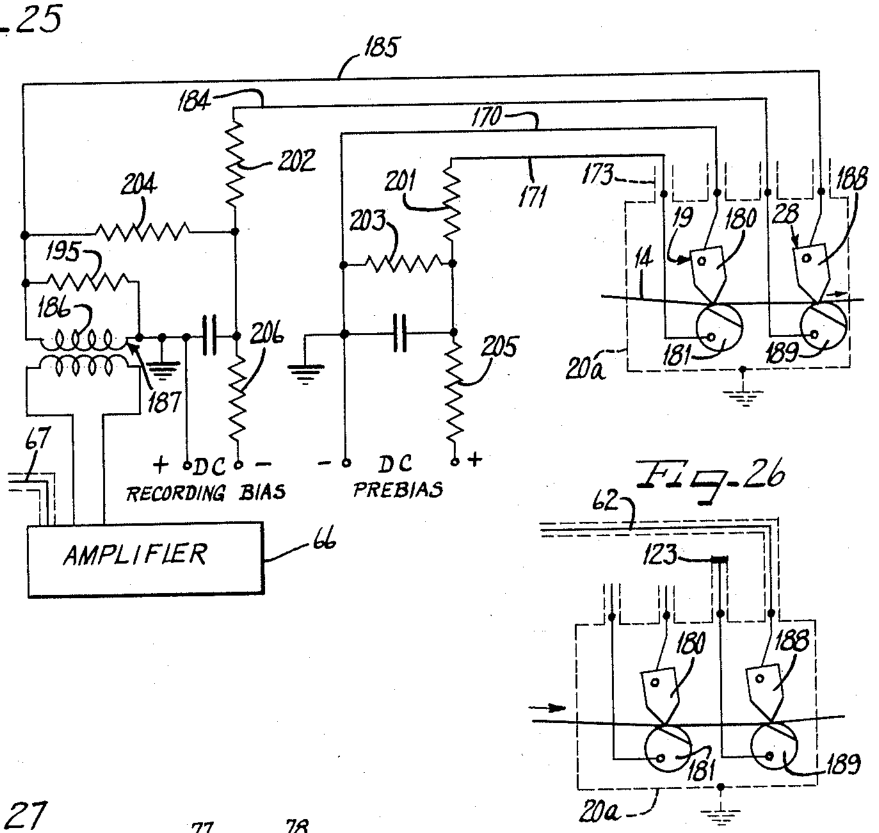
Figure 27:
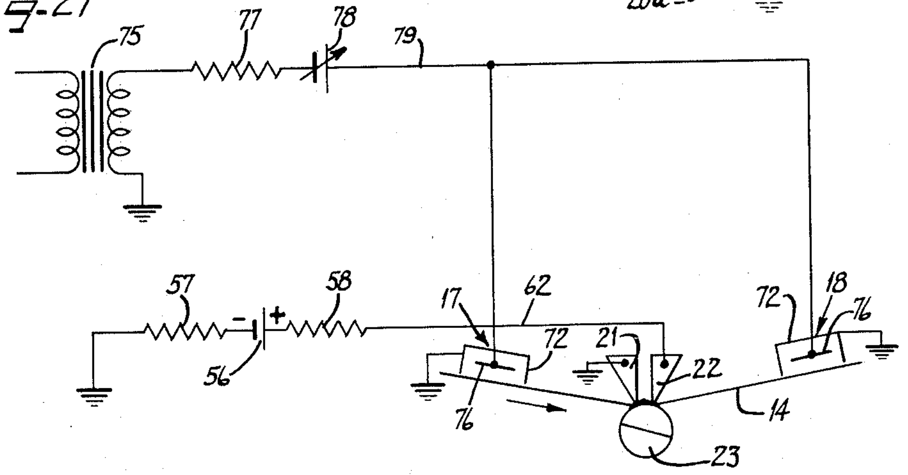
Figure 28:
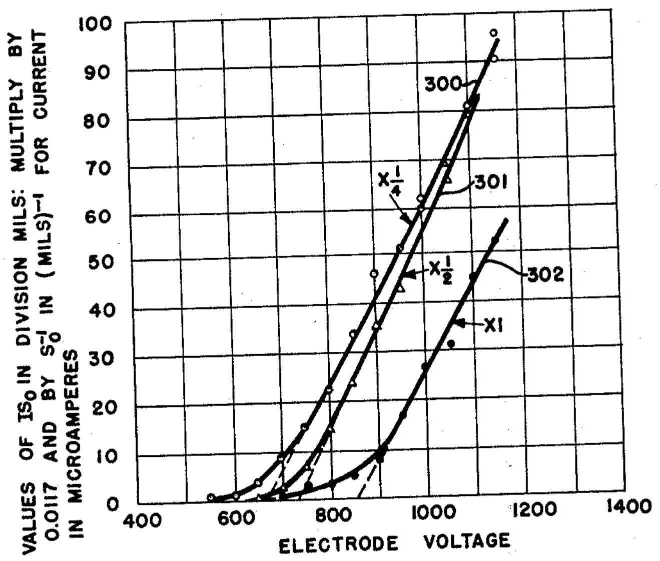
Figure 31:
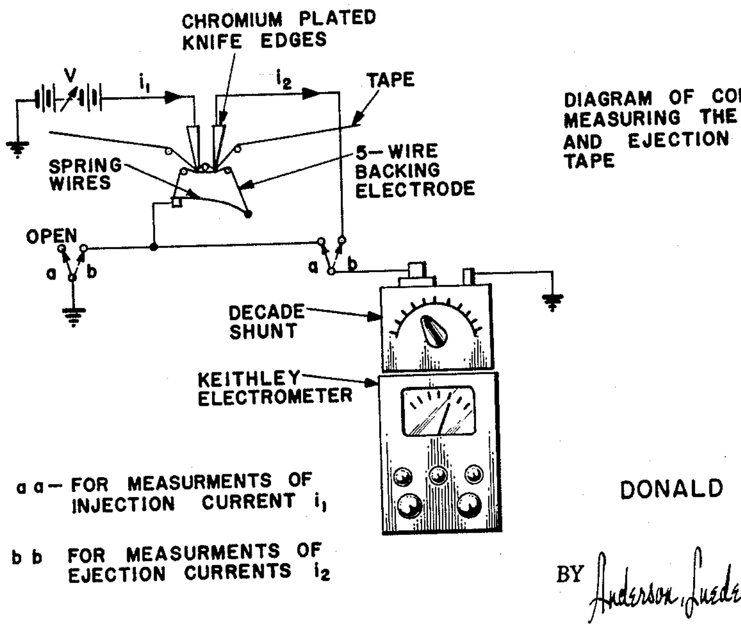
Figure 28A:
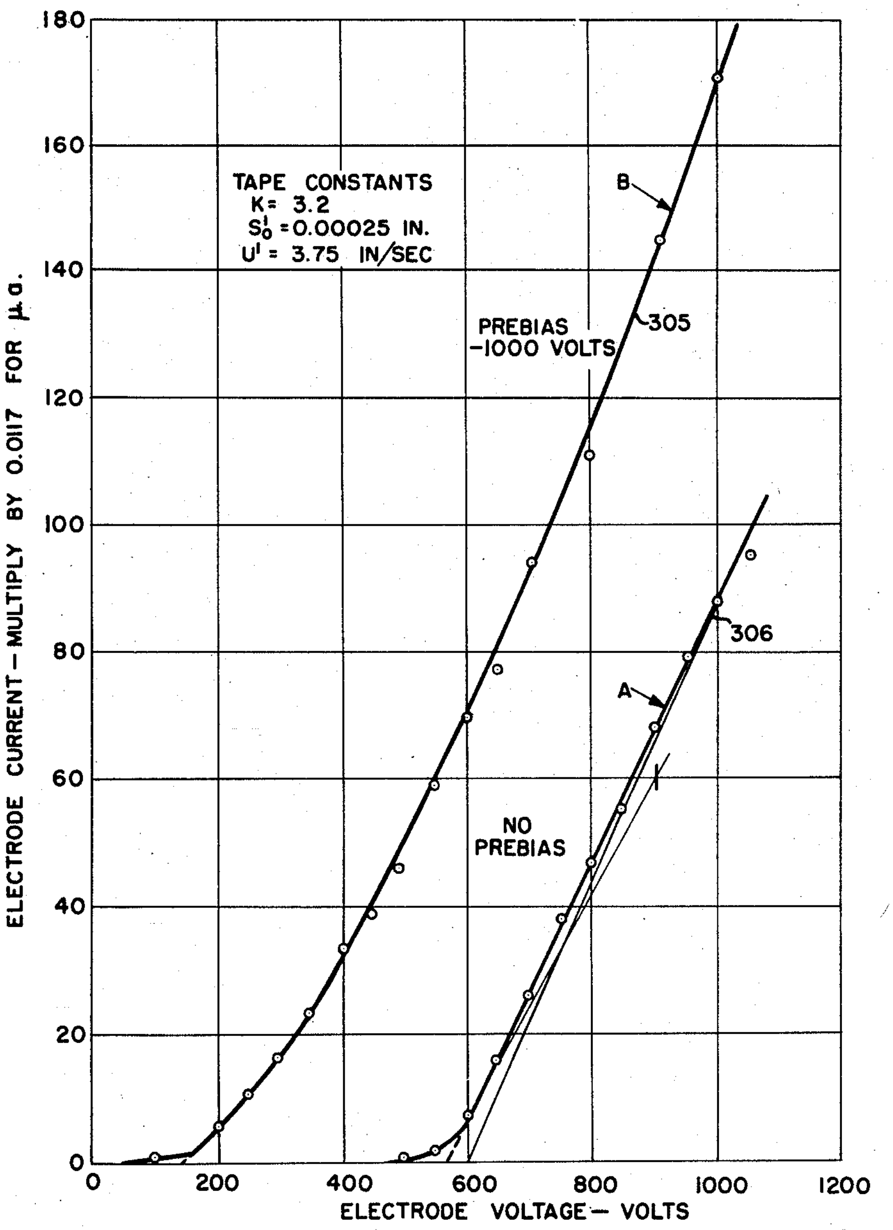

FIGURES 18 and 19 each show further modifications of electrode structure generally similar to that shown in FIGURE 3;

FIGURE 20 shows an enlarged fragmentary sectional view of a modified form of record medium guide which may be applied to the structure shown in FIGURE 3;

FIGURE 21 illustrates in diagrammatic form, partly in perspective and broken away, the ion source shown in FIGURE 1;

FIGURE 22 is an enlarged view of a head assembly using separate backing electrodes for the prebias and recording knife edges;

FIGURE 23 is a diagrammatic view of an alternative electrode structure for substitution in the embodiment of FIGURE 22;

FIGURE 24 is a diagrammatic view of a charge injection recording system utilizing the head assembly of FIGURE 22;

FIGURE 25 is a diagrammatic view of an electric circuit for use with the head assembly of FIGURE 22 during recording;

FIGURE 26 is a diagrammatic illustration of the head assembly of FIGURE 22 conditioned for playback operation;

FIGURE 27 is a diagrammatic view of a system for treating electrostatic record tape;

FIGURES 28 and 28A are plots of electrode current as a function of an electrode voltage for various thicknesses of Mylar tape and with and without prebias voltage, respectively;

FIGURE 29 is a diagrammatic illustration of an experimental arrangement for measurement of penetration and escape currents;

FIGURE 30 is a plot of motional current as a function of electrode voltage for Mylar tape; and FIGURE 31 is a diagrammatic illustration of the experimental arrangement for measuring the motional injection and ejection currents of Mylar tape.

As shown on the drawings:

The principles of this invention are particularly useful when embodied in an electrostatic recorder assembly such as illustrated in FIGURE 1, generally indicated by the numeral 10. The assembly includes a rotatably mounted supply reel 11, a rotatably mounted take up reel 12, a head assembly 13 disposed intermediately therebetween, for receiving a record medium 14, such as of Mylar tape, from the supply reel 11 on its way to the take up reel 12. An external tape guide 15 is provided intermediate the supply reel 11 and the head 13 to insure that the record medium or tape 14 enters the head 13 at a constant position, while an external roller 16 performs a similar function at the discharge side of the head 13 for insuring that the record medium 14 leaves the head at a constant relative angle on its way to the take up reel 12. Immediately prior to the entrance of the record medium 14 into the head 13, there is disposed an ion source 17, and immediately preceding the rewinding of the record medium 14 on the take-up reel 12, there is disposed a second ion source 18.

Figure 2:
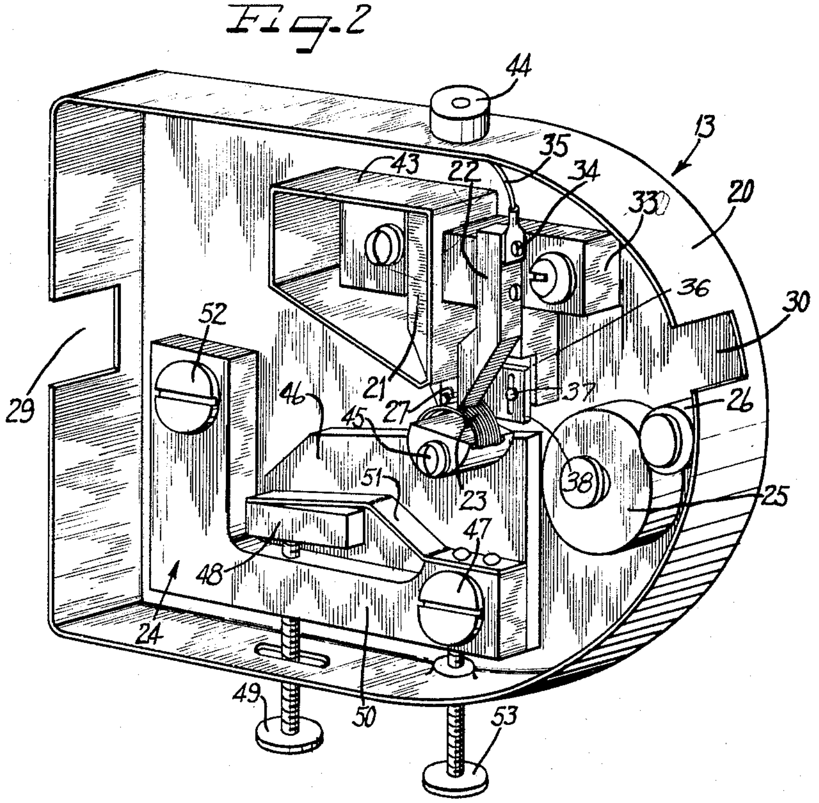
FIGURE 2 is an enlarged view of the head assembly of FIGURE 1.

Referring now to FIGURE 2, the head assembly 13 shown on FIGURE 1 is shown again in perspective in somewhat larger scale, and with its cover removed. The head 13 includes a case 20 preferably of metal in which there is disposed a prebias electrode 21, a record electrode 22, a backing electrode 23, a means 24 for adjusting the backing electrode, a capstan drive roller 25, and a shiftable rubber pinch roller 26. A guide pin 27 is shown between the electrodes 21 and 22, between which is also located a grounded prebias shield 43. By reference to FIGURES 1–3, it will be observed that the record medium 14 enters the case 20 through a slot 29, passes in contact with the electrodes 21–23, passes above the capstan roller 25 and between the roller 25 and the roller 26, beneath the roller 26 and upwardly at an angle through a slot 30 to the roller 16 for rewinding on the take-up reel 12. Since the record medium 14 is slightly elastic, the rollers 25, 26 are preferably disposed as close to the electrodes 21–23 as practicable to preclude "wow" sounds. At the electrodes, the record medium travels first past a prebias position in contact with the lower edge of the prebias electrode 21, which also serves as an erasing means, and then through a second or recording position adjacent to the lower edge of the record electrode 22.

In the illustrated embodiment, the electrodes 21, 22 are substantially identical to each other and each preferably comprises stainless steel having an integral knife edge 31 and 32 respectively, best seen in FIGURE 3, engaging one side of the tape. Preferably, each of the knife edges 31 and 32 represents the intersection of a pair of lapped surfaces which have been chromium plated at the point of engagement with the record medium 14. The knife edges 31 and 32 may have a radius of .025" and be operative; if the radius be reduced to .0005" a much better frequency response and higher signal to noise ratios are obtained. Therefore, a further decrease in radius, such as to that obtained by the intersection of two lapped surfaces, produces a further improvement in frequency response and improved signal-to-noise ratio.

Figures 4, 6:
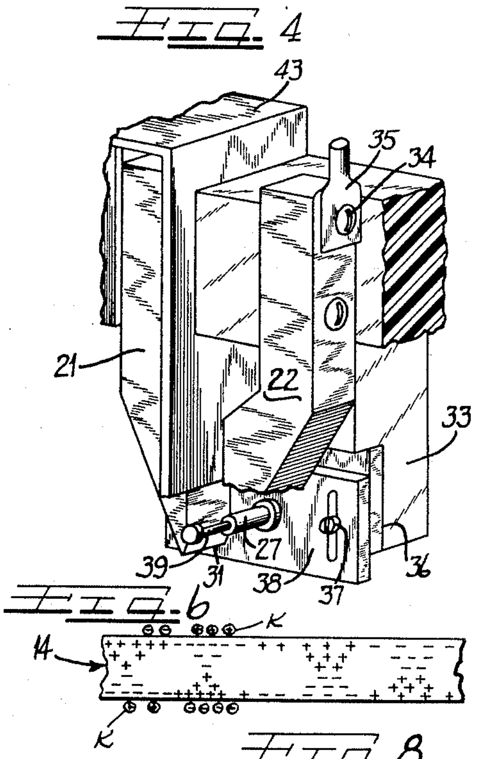
FIGURE 4 is generally similar to FIGURE 3 with portions omitted and broken away for clarity.
FIGURE 6 is a diagrammatic view of the record after it has travelled across the recording head of FIGURE 3.

An electrode support 33, such as of insulative material, is carried by the case 20 and receives and supports one or both of the electrodes 21 and 22. In this embodiment, each of the electrodes 21 and 22 are secured as by a pair of screws 34 extending therethrough into the support 33, one of which may also be used to secure the electrical lead 35 extending thereto. The supporting means 33 may also include a spacer 36 secured thereto and which threadably receives a pair of screws 37 extending through slots in a pin plate 38 which supports the guide pin 27, as best seen in FIGURE 4. In this embodiment, each of the knife edges 31 and 32 has a length of 5⁄16" for use with a tape having a width of ¼". The pin 27 has a pair of confronting shoulders 39 between which the tape 14 extends centrally of the knife edges for abutting the lateral edges of the tape 14. The plate 38 is adjustable in a vertical direction so that the pin 27 may be moved vertically intermediate the electrodes 21 and 22.

The backing electrode 23 includes a conducting member 40 having a plurality of fine wires 41, such as of tungsten or nickel, spaced in a single layer in close side by side relation to each other for engaging the opposite side of the record medium 14 at the knife edges 31 and 32. Tungsten is the more durable, but nickel has an advantage explained below. Best results have been obtained when the diameter of the wires 41 has been held to a minimum. Particularly good results have been obtained when 175 wires each having a diameter of .001 inch and occupying a width less than 0.180 inch have been utilized, with a record medium ¼ inch wide, and excellent results may also be had with the use of wire having a diameter of .0007 inch, the smaller wire, however, being somewhat more difficult to assemble. Each of the wires is connected to the conducting supporting block member 40, both mechanically and electrically.

The record medium, as best seen in FIGURE 3, is directed under the knife edge 31 and against the wires 41, above the guide pin 27 intermediate the shoulders 39, and beneath the knife edge 32 against the wires 41 and outwardly from both sides thereof. The prebias electrode 21 and the backing electrode 23 jointly serve as a prebias head, while the record electrode 22 and the backing electrode 23 jointly serve as a record head. Thus the instant assembly comprises a prebias and record head having a common backing electrode. In order to minimize coupling between the electrodes 21 and 22, the shield 43 may be grounded to and carried by the case 20 and disposed intermediate the prebias and record electrodes. Preferably, the shield 43 extends substantially about the prebias electrode 21, there being but a small opening through which the knife edge 31 extends.

One or more terminals 44 may also be provided in the case 20 as may be necessary.

The backing electrode 23 may be secured by an eccentrically disposed screw 45 to a supporting plate or member 46, best seen in FIGURE 2, the plate 46 being angularly rockable or rotatable about a pivot 47 disposed beneath the electrodes 21 and 22. As the electrode 23 is rocked about the screw 45, a differential adjustment takes place between the engagement of the wires 41 with respect to the knife edges 31 and 32. Thus if the electrode 23 is rocked clockwise, the engagement force at the electrode 22 is slightly increased while the force at the electrode 21 is decreased. Thus this adjustment produces a differential change in the relationship between the backing electrode 23 and the other electrodes. The plate 46 has an ear 48 rigidly carried thereby which is engaged by a screw 49 which extends through the case 20 and is threaded in a bracket 50. When the screw 49 is advanced, it acts against the ear 48 to pivot the support means 46 about the pivot 47 to effect a lateral adjustment of he backing electrode 23. When the screw 49 is retracted, a leaf spring 51 also carried by the bracket 50 acts on the opposite side of the ear 48 to effect an opposite lateral adjustment of the support 46.

The bracket 50 is pivoted as at 52 to the case 20 and is rocked about the pivot 52 by movement of a screw 53 which is threadably carried by the case 20 and which acts against a lever arm portion of the bracket 50. When the screw 53 is advanced, the pivot 47 is also advanced so that the backing electrode 23 is moved toward the other electrodes 21 and 22, and when the screw 53 is retracted, the pivot 47 is moved or translated in an opposite direction so that the electrode 23 is retracted simultaneously from both of the electrodes 21 and 22. In that the lever arm between the pivot 52 and the screw 53 is rather lengthy, there is very little differential adjustment which occurs between the knife edges when the screw 53 is repositioned. Of course, the screw 53 is retracted when a record tape 14 is to be threaded through the head assembly 13. The position of the screws 49 and 53 is so selected that the wires 41 resiliently press the tape against the knife edges 31 and 32 with the desired tension. It will be understood, of course, that the parts just described are all suitably insulated electrically, which insulation may be omitted if one of the parts is used in a circuit wherein it is at ground potential.

The use of a common backing electrode facilitates the use of another one of the features of the instant invention described later herein. Furthermore, when the knife edges 31 and 32 are substantially spaced from each other as they are in FIGURE 22, there is a tendency for a given point or line along a tape not to engage one backing electrode in exactly the same manner as the following backing electrode. By having but one common backing electrode, this tendency is avoided. This problem becomes most acute at the edges since the record medium tape must be wider than all of the wires 41 collectively to make certain that there is no direct electrical contact or short circuiting cross or around the record medium. For this reason, there is a very slight amount of tape at each margin which is not directly exposed to the electrical action, and the use of a common backing electrode somewhat simplifies the problem of exposing the tape at the second electrode or position to precisely the same place as it was exposed to at the first electrode or position. In this regard, the spaced shoulders 39 of the guide pin 27 accurately guide the tape laterally or center it with respect to the wires 41 and the pin 27 also serves to lift the tape from the backing electrode to reduce the drag at this point.

In FIGURES 2 and 3, the diameter of the wires 41 has been greatly exaggerated and the quantity has been greatly minimized. In an actual embodiment, the exact number is not critical. Of course, the number is limited by the wire diameter and the width of the tape 14. The minimum number required is determined solely by reliability, and experiments to date indicate that as few as one may be advantageously employed.

Figure 5:
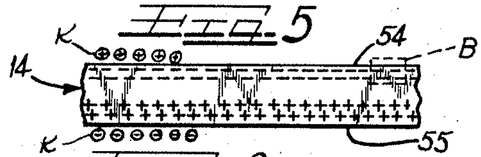
FIGURE 5 represents diagrammatically the condition of a record after travel across the prebias head of FIGURE 3.

When the tape 14 has been prebiased by travel past the prebias electrode 21 of the head 13, it takes on a condition such as shown diagrammatically in FIGURE 5. To form the tape of FIGURE 5, a negative voltage is applied to the knife edge 31 of the head 13 so that electrons are injected into an internal region of the tape near the top side or surface 54. Similarly in FIGURE 5, the wire electrode is positive so that an internal region of the tape near the lower surface or side 55 thereof will receive a corresponding net positive charge. If the prebias voltage is maintained at a constant non-fluctuating value, the charge per unit length along the tape in the region near each surface is substantially constant.

When the prebiased tape illustrated in FIGURE 5 travels past the recording electrode 22, the charge pattern along the tape is altered so that the charge distributions in the upper and lower portions of the tape vary in accordance with the signals applied to the recording electrode, as illustrated in very diagrammatic form in FIGURE 6. No attempt has been made in FIGURE 6 to illustrate the actual charge polarities which would be obtained in practice. With no signal applied, substantially all of the charges shown in FIGURE 5 are neutralized, the tape being thus left in an uncharged or erased condition.

Figure 9:
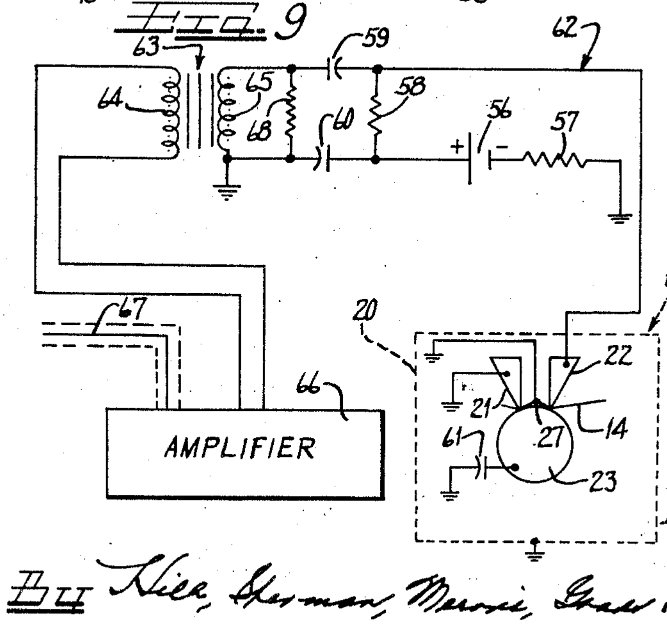
FIGURE 9 is a diagrammatic view of a preferred electric circuit for use with the apparatus of FIGURE 2 during recording.

FIGURE 9 illustrates a preferred recording circuit for use in conjunction with the head assembly of FIGURE 2. It will be observed that the D.C.-prebias voltage is applied to the electrode 22 and that the D.C.-circuit then extends through the record medium 14 to the backing electrode 23 and again through the record medium 14 to the prebias electrode 21. To this end, the D.C.-circuit is also provided with a power supply 56, having a potential of 1500 volts. For the protection of both personnel and the backing electrode 23, a current limiting resistor 57, such as 1.5 megohms, is provided in series in the circuit. In the instant embodiment, a coupling resistor 58 has a resistance of one megohm which further limits the current in the D.C.-circuit. It will be also noted that each of a plurality of capacitors 59–61 serves as a blocking capacitor to prevent the flow of direct current. With this circuit, the voltage drop between the prebias electrode 21 and the backing electrode 23 is on the order of 900 volts while the voltage drop across the record medium 14 at the record electrode 22 is about 600 volts. If the voltage of the power supply 56 is varied, the voltage differential across the record medium at the record electrode remains substantially at a potential of 600 volts. It will be noted that the negative terminal of the power supply 56 is grounded and that the prebias electrode 21, the pin 27, and the case 20 are also grounded. Thus positive potential is applied to the record electrode 22 while the backing electrode 23 is relatively negative, and that with respect to the prebias electrode 21, the backing electrode is relatively positive, having a D.C.-voltage to ground which is 60% of the D.C.-voltage at the record electrode 22.

Figures 10, 11, 12:
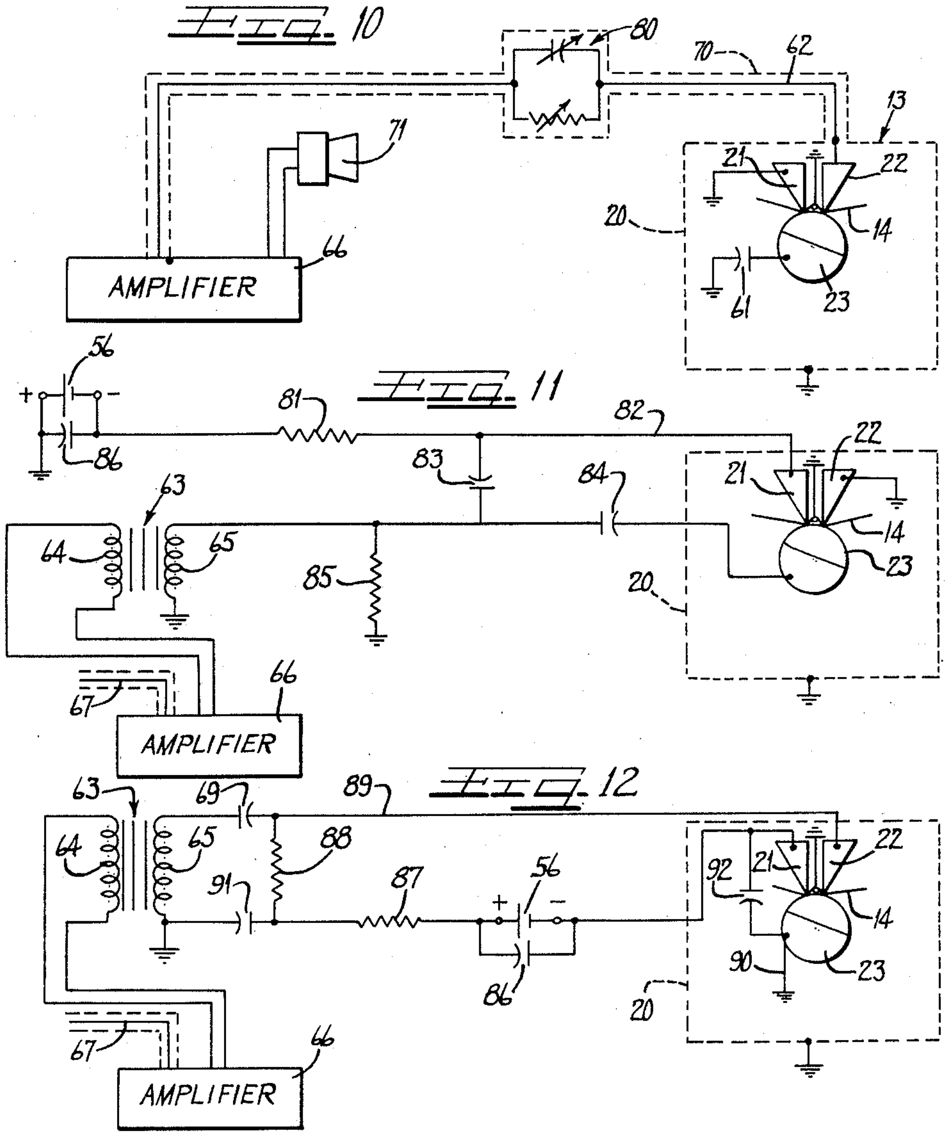
FIGURE 10 is a diagrammatic illustration of a preferred electric circuit for use with the apparatus of FIGURE 2 during playback of a charge injection record.
FIGURE 11 is a diagrammatic view of another preferred electric circuit for use with the apparatus of FIGURE 2 during recording.
FIGURE 12 is a diagrammatic view of still another preferred electric circuit for use with the apparatus of FIGURE 2 during recording.

It is to be noted that only a single conductor 62, which is shielded as shown in FIGURE 10, is directed to the head assembly 13.

The signal is illustrated as being introduced by means of an output transformer 63 having a primary 64 and a secondary 65. The primary 64 is coupled to a transcription amplifier 66 which receives a suitable input at 67. A resistor 68 is connected across the secondary 65 of the transformer 63 to insure that the transformer operates into its proper load impedance, the resistor 68 being of 100,000 ohms in the instant embodiment. Thus the elements 58, 59 and 68 insure that the transformer 63 operates into a substantially constant load resistance. They also serve to protect the secondary 65 against overload. The resistor 68 also serves to provide a non-inductive discharge path in the circuit. The resistor 58 also serves as a mixer for introducing the direct current and the signal current to the common conductor 62.

It will be noted that the output from the amplifier has one grounded side and that the secondary of the output transformer is likewise grounded. The A.C.-circuit extends through the coupling capacitor 59, which has a capacitance of .005 mfd., through the single conductor 62 to the record electrode 22. Here the A.C.-signal is superimposed on the D.C. passing therethrough and likewise passes through the moving record medium 14 to the backing electrode 23, and thence to ground via the capacitor 61, which has a capacitance of .000050 mfd.

The blocking capacitor 60 has a capacitance of .03 mfd. and in conjunction with the capacitor 59, and the resistances 68 and 58, jointly comprise an R-C circuit which serves to boost the normally attenuated voltages of the higher audio frequencies present. The values first given for these resistances are advantageous and have been given to provide a ready comparison between this circuit and others presently to be described. However, the high frequency boost just mentioned is even better accomplished if the resistor 68 is increased in size to eight megohms and if the resistor 58 is increased in size to ten megohms.

The ratio of the transformer 63 is primary-to-secondary, one-to-fifty. It is considered preferable to have the electrode 22 of positive D.C.-polarity when recording on "Mylar" tape with the illustrated circuit, although this polarity is not a necessary condition.

Furthermore, one advantage to the instant circuit is that if the electrode 21 be made of metal, such as described above, the shield 43 may be omitted. Nevertheless, a slight advantage is present when it is retained. Further, since the electrode 21 is grounded, it may be secured directly to the case 20 in conducting relationship therewith.

Referring now to FIGURE 10, there is illustrated the playback circuit. Obviously, the instant circuit may be combined with the circuit of FIGURE 9 so that one may be switched on when the other is switched off. Where a single lead 62 is employed leading to the head assembly 13, the lead 62 preferably includes shielding such as shown at 70 extending between the head assembly 13 and the amplifier 66. During playback, the record member 14 is in engagement with the electrodes 21–23 in the same manner as in recording. The output of the amplifier 66 of course is directed to a suitable output device such as a loud speaker 71. The backing electrode 23 remains capacitatively connected to the case 20 and the return circuit therefrom may be via the shielding 70.

Certain known amplifiers are provided with an equalizer circuit which has a continuously variable control for matching any recording characteristic. Preferably, the amplifier 66 is such a device and has such a feature. However, if such a feature is inadequate, an R-C circuit 80 may be provided in the lead 62 as shown in FIGURE 10. The variable capacitor (.0005 mfd.) and the variable resistor (2 megohms) thereof may be adjusted to suit personal preference. Of course, this feature may be omitted if the amplifier or taste of the user does not require it.

Referring now to FIGURE 21, there is shown one of the ion sources 18 in greater detail. The source 18 includes a conductive case 72 which is open at one side 73, and which is provided with an electrostatic shield 74 across the opening 73. The opening 73 is disposed immediately adjacent to the record medium 14 as best seen in FIGURE 1. The case 72 is preferably grounded. A transformer 75 has its output connected between the case 72 and a pointed tungsten electrode 76 disposed within the case.

The transformer 75 may be any conventional type, and preferably is powered by commercial voltage at a commercial frequency. The transformer has a primary-to-secondary ratio such that the output voltage is about four thousand volts. In this embodiment, one side of the secondary is grounded while the other side is connected in series with a current limiting resistor 77, in this embodiment having a resistance of five megohms, and thence through a high voltage conductor 79 to the electrode 76. Application of voltage as described produces a slight corona at each of the tips of the electrode 76, and air diffuses through the open side 73 to become ionized and when ionized, to diffuse back again against the record medium 14. With this arrangement sufficient positive and negative ions are produced and made available outside the shield to neutralize the field of the recorded charges externally of the record medium 14.

The roller 26 preferably comprises a conductive rubber which is resistant to ozone produced by the source 18, and which conducts any surface charge collected from the record medium 14.

It will be noted that the A.C.-field is applied between the electrode 76 and the shield 74, and therefore the field does not extend outwardly of the ion source, and therefore does not provide a source of interference or of permanent signals.

Figure 7:
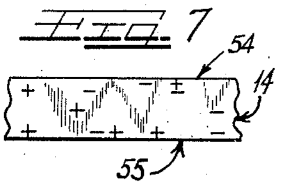
FIGURE 7 is a diagrammatic view of a section of recording tape as it is received from the manufacturer.

Referring to FIGURE 7, the condition of the virgin tape is diagrammatically illustrated. It will be noted that there is a quantity of electrostatic charges disposed within the thickness of the tape, intermediate the surfaces 54 and 55, the thickness being greatly exaggerated from the actual thickness of .00025 inch.

When the tape has been subjected to the prebias electric field, it first takes on a condition such as shown diagrammatically in FIGURE 5. Thereafter, when the prebiased tape 14 shown in FIGURE 5 is subjected to a similar field of opposite polarity, the charge pattern along the tape is altered so that the charges therein are effectively neutralized. Theoretically, the tape should thus be left in an uncharged condition. As a practical matter, however, perfection is not achieved; however, there is a substantial decrease in the number of randomly spaced charges in the tape, such as shown in FIGURE 8, as evidenced by reduced noise output from the tape when passed through the playback system.

Figure 8:
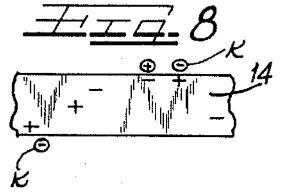
FIGURE 8 represents diagrammatically the condition of the record medium after travel across the second electrode of FIGURE 27.

Further, we have found that the best resutls are obtained if the tape 14 is stored in the condition indicated by FIGURE 8 for a period of time following the neutralizing of charges. The net improvement is not too predictable until at least seven days' storage time has elapsed, after which period further storage reduces the level of background noise.

Further, if virgin tape be stored in a desiccated chamber, such as in the presence of active silica gel, such storage effects a reduction in background noise, even though the tape has not been treated electrically as described. However, the best results are obtained when the tape is subjected to both the electrical treatment and to the desiccation during the storage period which follows thereafter.

As may be expected, the greatest improvement tends to occur during the early portion of the storage period, particularly after the first seven days have elapsed. However, it has been observed that background noise continues to decrease for at least as long as 46 days.

When Mylar tape is handled as supplied, and also due to its handling, there is a tendency because of friction with materials against which it comes in contact to develop static surface charges. These charges, when of opposite sign attract, and when of like sign, repel in a well known manner, much like an electroscope. However, we have found that substantially all of the surface charges are neutralized by exposing the tape to one of the ion sources 17, 18. The neutralizing of the surface charges precludes such charges from contributing to the background noise obtained from the record medium.

FIGURES 1, 9 and 21 disclose apparatus by which the foregoing electrical steps may be accomplished. Referring now to FIGURE 27, there is shown schematically that portion of the apparatus which may be used to effect the electrical conditioning steps. The tape 14 is drawn between the electrodes 21, 22 having the common flexible backing electrode 23. A 1500-volt D.C.-bias potential is supplied by the power supply 56 and is applied to the two tape surfaces while the tape 14 is in motion. Under this set of conditions, the total bias voltage divides automatically in the approximate ratio of 1.5 to 1 between the first knife-edge-to-backing electrode and the second knife-edge-to-backing electrode. For this voltage division, the voltage of the tape in transit between the two knife-edges approximately equals one-half of the tape threshold voltage, threshold voltage being the voltage that must be applied across moving virgin tape before any appreciable motional current results through it.

The common backing electrode 23 engages the side of the tape 14 opposite to that of the other electrodes 21 and 22, and except for such engagement, is electrically insulated from the circuit. Since the two knife-edges are in D.C.-series through two series thicknesses of tape 14, the motional D.C.-bias current of the tape is identically the same under each knife-edge but oppositely directed through it. This causes the tape to emerge from the electrodes in a substantially uncharged condition.

The ion generators 17 and 18 are disposed adjacent to the electrodes 21, 22, one being on each side thereof whereby the generator 17 may emit ions to the record medium 14 before it is treated electrically by the electrode 21, and whereby the generator 18 may act on the record medium 14 after it has been acted on by the electrode 22.

Therefore, it is seen that the medium 14 is subjected to a uniform biasing electric field of a magnitude exceeding the threshold value for the surface of the record medium but less than the breakdown electric field strength. This effects an injection of electric charges of opposite sign into opposite sides of the record medium, the charges being on the interior of the tape and being uniformly distributed. Stated otherwise, the record medium is subjected to a uniform electric field which establishes a direct current flow of charges across the surface barrier of the record medium and into successive minute regions of the record medium, whereby the charges are bound below the surface thereof within the interior of the record medium. While relative movement is utilized for this step, preferably such movement is effected by moving the record medium 14.

The foregoing step thus is applied to the record medium 14 first such as by the electrodes 21 and 23. Thereafter, at a second position represented by the electrodes 22 and 23, the medium is subjected to a second field similar in character to that to which it was first exposed, but opposite in direction and polarity and having about two-thirds of the potential difference.

Both before and after these electric field steps, the record medium is preferably exposed to the source of ions which neutralize all electrostatic surface charges on the record medium. Thereafter, the medium is stored as described above, preferably in desiccated air for a period of time exceeding seven days.

The following example is given to indicate the magnitude of the results achieved by the foregoing steps. It is to be understood that these values are representative and are not presented to limit the invention. Typical tape had a noise value which averaged .329 millivolt before it had been used. After seven days' storage in a desiccator, the average noise level had decreased to 0.296 millivolt. After about forty-six days' storage, the average noise level had decreased to about 0.237 millivolt. Of course, the noise level is not constant. The spread after seven days in noise level was on the order of 0.085 millivolt, while after forty-six days, the spread had decreased to 0.071 millivolt.

A similar tape which had an initial average noise level of 0.329 millivolt was subjected both to the above described electrical field steps and the desiccated storage. After seven days, the average noise level was 0.319 millivolt, while after forty-six days' storage, the average noise level was 0.204 millivolt. The spread after seven days was 0.065 millivolt, which decreased to 0.037 millivolt at forty-six days.

While other data and examples are available, the foregoing represents typical results. An analysis of these figures indicates that the average noise level goes down due to desiccation, and that the average noise level also goes down due to the electrical treatment described. It also indicates that a greater improvement is effected by utilizing both of the steps. Further, the spread between the peaks of noise decreases with desiccation alone, and decreases more when both desiccation and electrical treatment are applied.

Since both the average noise level and the spread between noise peaks decrease, it is apparent that the highest or upper noise peaks are decreased or neutralized more efficiently than are the lower peaks.

The mechanism of charge injection is believed to involve the transfer of charge to shallow internal regions of the record medium below the surface thereof. The motional inductance of the medium varies in inverse proportion to tape thickness at a fixed tape speed and width.

Experiments have been carried out in which two and three "Mylar" tapes are superimposed upon one another and drawn between recording electrodes. With a two-ply "Mylar" tape, the value of threshold potential was found to be approximately 100 volts greater than for a single tape, while for a three-ply tape, the threshold voltage was found to be about 200 volts greater than for a single tape.

A two-ply tape was separated into two single ply tapes on different reels and the two tapes were played back separately; the performance of the two tapes was nearly identical, although the tape which had been in contact with the knife edge electrode during recording produced a very slightly greater output. A three-ply was separated for playback; all three tapes produced about the same playback output, but the tape which had been in contact with the knife edge electrode during recording again produced a slightly greater output. These experiments tend to indicate that the quantity of positive charge injected into a tape by one recording electrode is substantially the same as the quantity of electrons injected into the tape by the other recording electrode using the electrode structures illustrated in FIGURE 3.

Recordings were made with different values of prebias and recording bias; it was found that for each prebias voltage there is initially an optimum recording bias as to volume of output and freedom from distortion on playback, with lesser values of playback voltage and eventually distortion occurring for both greater and lesser recording biases. Near-maxima of signal-to-noise ratios also obtain for these optima conditions. Further, as the various prebias-bias recordings are played back after a time interval of days, it is found for records having prebias values in excess of 1000 volts (such as for 1100 and 1200 volts) that the optima of output and greatest freedom from distortion occur at lower recording biases than those originally observed. Similarly, for records having prebias values of 900 volts or less (such as for 800 and 700 volts) the optima of output and greatest freedom from distortion occur at higher recording biases than those originally observed. For all records, regardless of the initial prebias, the optimum values of recording bias (for "Mylar" tape of grade C as manufactured by E. I. du Pont de Nemours & Co., Inc., and of the thickness of 0.00025") approach values in the immediate neighborhood of 600 volts after a time delay of a week to ten days. In particular, a prebias-bias combination of (−1000, +600) has been found to constitute a design center (for "Mylar" grade C tape of 0.00025" thickness) in the neighborhood of which near-optimum conditions obtain simultaneously for output voltage, freedom from distortion, and high signal-to-noise ratio from the time of initial recording to thereafter.

It is thought that the maxima of playback output voltage with respect to bias voltage for various prebias voltages are dependent upon the effective depth of charge penetration accompanying the charge injection process of recording. As the recording bias is increased, for a given prebias, the depth of charge injection continues to increase. As this takes place, the charges within the tape, on either side of the tape's median plane, become more and more closely bound to one another as their distance of separation decreases. Also, the exterior electric field becomes (relatively) less and less strong with the decrease in charge separation so that although the internal charge densities on the opposite sides of the tape median plane become greater and greater with increased bias voltage, a condition eventually obtains for which and beyond which less and less induced playback bound charges can be drawn to the metal surfaces of the electrodes adjacent to the tape. Therefore, there exists, for a given prebias voltage, a particular recording bias for which the playback output voltage is a maximum, output voltage being less for smaller values of bias because of weaker initial internal charge injection and weaker for greater values of bias because of less favorable location of internal tape charges for producing electrostatic induction in the electrostatic pickup system.

It is possible to show experimentally that electrostatic recording as disclosed herein does not employ polarization of a ferroelectric material such as barium titanate by two direct methods: (1) the observed polarity of remnant electric field from the record medium is that expected from charge injection and opposite to that expected from ferroelectric polarization; and (2), the record medium (Mylar) does not have ferroelectric properties. A considerable body of evidence, both direct and indirect, favors charge injection over ferroelectricity.

Charge injection, as used herein means the transport of charge across an electrode-dielectric interface and the consequent trapping or immobilization of this conductible charge in the dielectric. A volume density of trapped charge is thus created in the dielectric. If two electrodes are in contact with the dielectric and a difference of potential is maintained across the electrodes, charges of opposite sign may be simultaneously injected at the respective electrodes. The volume density of trapped charge produced in the dielectric near each electrode will correspond in polarity to the polarity of that electrode.

Ferroelectric polarization is a relatively well known phenomenon. A net dipole moment per unit volume or polarization is produced in the dielectric. The polarization may also be represented by two surface densities of induced charge of opposite polarity. Ferroelectric polarization differs from charges injection in that the transport of charge across an electrode-dielectric interface and the creation of a volume density of trapped charge in the dielectric does not occur.

If the electrodes in a charge injection system are maintained at the same difference of potential while they are removed from the dielectric, the volume densities of trapped charge in the dielectric will persist. The direction of the external electric field will be toward the surface having the negative trapped charge and away from the surface having the positive trapped charge adjacent thereto. This direction of the external electric field is characteristic of charge injection.

If the electrodes in a ferroelectric recording system are similarly removed, there will be a remnant ferroelectric polarization and the external electric field will be in the opposite direction from the external electric field produced by charge injection with respect to the polarity of the electrodes.

It is found experimentally for Mylar that the direction of the external electric field is characteristic of charge injection and not of ferroelectric polarization.

Another experimental approach has also been taken with respect to the question of the possible ferroelectric behavior of Mylar film. Ferroelectric materials must exhibit hysteresis and saturation properties. In particular, the medium frequency permittivity must decrease when a static electric field is superposed. Experimental information on the possible ferroelectric behavior of Mylar film has been obtained by measuring the incremental permittivities of Mylar and barium titanate under comparable conditions. The data indicates that Mylar does not exhibit ferroelectric behavior within the range of the measurements.

Certain features of the illustrated embodiments are considered highly important to high quality recording of musical signals and the like, although not essential for satisfactory recording particularly with other less critical requirements. For example, the wire backing electrode having the large number of resilient wires of relatively fine diameter is considered to be highly important in securing the intimate and stable contact between the electrodes and the tape.

Several advantages are obtained when wires as small as .0010" diameter or less are used for an electrode. Wires this fine result in an electrode which has substantial flexibility. A large number of points of contact with the tape is provided if wires of a small diameter are used, and a uniform "line-distribution" of current or charge injection is achieved which favors high frequency response and long signal life. The small wires provide small normal force against the tape per contact and small total normal force for a given electrode deflection. This results in little or no cutting or wear of the tape by the knife edges and negligible accumulation of material between each knife edge and the tape, whereby there is little loss in the effective width of the electrode with time. Low tape friction also results because of the low normal force and this effects a reduction in vibration, reduction of "wow," and a minimized tendency for tape squeal. Because of the low normal pressure and great electrode flexibility, tape splices, markers, etc., pass through the head freely. Further, a higher signal-to-noise ratio and a higher frequency response are obtained with small wires than with larger ones. The structure shown in FIGURE 1 hereof has operated with a signal to noise ratio of 137.8 to 1 or 42.7 db, at 800 c.p.s., at a tape speed of 11¼ inches per second.

The use of polyester film for record tapes is also considered highly advantageous, particularly since the high tensile strength of the film, which may reach 20,000 pounds per square inch, provides a very strong film even though the film is made very thin. A very thin film is believed desirable not only to reduce the required electrode voltages, but also to enhance the strength with which the charges are mutually bound within the tape. It is preferred that the record medium have a thickness of the order of .00025 inch. Generally, it is considered to be ideal to have the thickness of the record medium such that the breakdown voltage will be of the order of twice the threshold voltage for the unbiased record medium.

Even though certain features which are considered at present to be crucial for high quality recording, the invention in its broader aspects is not to be construed as limited to the specific examples described, since a wide variety of electrode or other charge injection configurations and materials, circuits, and record configurations and materials may be employed as will be apparent to those skilled in the art.

By way of illustration recordings may be made on other materials having the desired mechanical and dielectric characteristics. Cellulose acetate is another example of a suitable material for many applications. While the specific embodiments illustrated in the drawings are of special advantage in the recording of voice and music signals, it will be understood that the invention is applicable to the recording of signals of all types with suitable modifications in circuit and electrode structures which will be apparent to those skilled in the art.

The term "discrete charges" as used in the claims refers to charges constituted by an excess or deficiency of electrons in a given region as distinct from the charges which may appear due to polarization of molecules or larger particles without any net change in charge in the entire region of the polarized molecules or larger particles.

Figure 14:
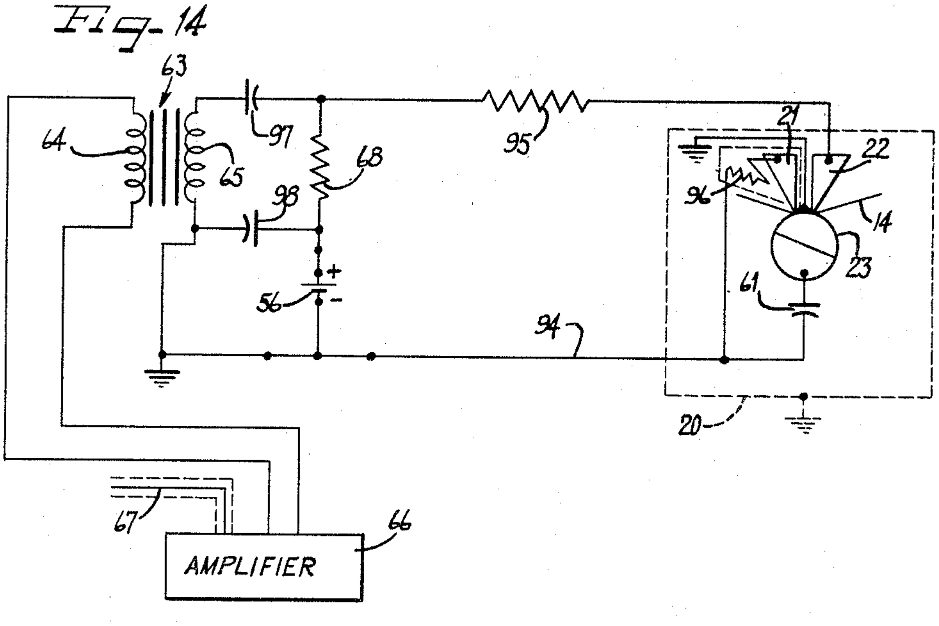
FIGURE 14 is a diagrammatic view of a still further preferred electric circuit for use with the apparatus of FIGURE 2 during recording.

The circuit of FIGURE 9 may be altered or modified in several respects without losing its advantageous features. FIGURES 11, 12, and 14 each illustrate variations or modifications of the circuit shown in FIGURE 9, and wherein one or more of the advantageous features of the FIGURE 9 circuit are contained.

Referring first to FIGURE 11, there is disclosed a circuit which may be used with a head structure wherein the record electrode 22 is grounded. Therefore, the circuit of FIGURE 11 may be used to advantage without the shield 43. However, it is to be understood that use of such shield is preferred from a performance standpoint. The 1500 volt power supply 56 is connected as before so that one side is grounded, but in this instance, it is the positive terminal which is grounded. The negative terminal leads to a current limiting resistor 81 having a resistance of 200,000 ohms. The D.C.-circuit continues through a conductor 82 to the prebias electrode 21 which in this instance is preferably of metal. As before, the D.C.-circuit may extend from the positive terminal of the power supply 56, via ground to the record electrode 22, thence through the record medium 14, the backing electrode 23, again through the record medium 14 to the prebias electrode 21 for return. A pair of blocking capacitors 83 having a capacitance of .02 mfd., and 84 having a capacitance of .0001 mfd. isolates the direct current circuit from the A.C.-grounds.

A load resistor 85 having a resistance of 200,000 ohms is connected across the secondary 65 of the transformer 63, which in turn is driven by the amplifier 66 as previously described. The A.C.-circuit extends from the one end of grounded secondary 65 via the coupling and blocking condenser 84 to the backing electrode 23, thence through the record medium 14 to the record electrode 22 and return by way of ground. The blocking condenser 83 serves to apply the same A.C.-potential to the prebias electrode 21 as appears on the backing electrode 23. Since there is no voltage drop thereacross, no A.C.-current flows between the backing electrode 23 and the prebias electrode 21. It will be noted that there is an alternate path for a portion of the A.C.-output from the secondary 65, such path extending through the resistance 81 and through a further by-pass capacitor 86 connected across the D.C.-power supply 56. Since the resistances 81 and 85 are in parallel, an equivalent load is placed across the secondary 65 by having them each twice as large as the resistance 68 shown in FIGURE 9. The capacitance of the capacitor 86 may be .02 mfd., and this capacitor also serves to remove noise or voltage variations in the D.C.-circuit which may be caused by internal resistance variations if the power supply 56 is a battery, or ripples if the power supply is a rectified source of direct current. The resistance 85 also provides a noninductive discharge path for the secondary 65. Thus also the resistance 81 has a current limiting function in both the A.C. and D.C.-circuits. In other respects, the operation of the circuit of FIGURE 11 is similar to that of FIGURE 9.

Referring now to FIGURE 12, there is disclosed a circuit wherein the backing electrode 23 is grounded. It will be noted that the D.C.-circuit does not extend through ground. To this end, the power supply 56 is connected at its positive terminal to a current limiting resistor 87 having a resistance of one megohm, which is in series with a second current limiting resistor 88 having a resistance of 100,000 ohms. The resistor 88 communicates via a conductor 89 with the record electrode 22. The circuit extends as before through the record medium 14, the backing electrode 23, the record medium 14, the prebias electrode 21, and back to the negative terminal of the power supply 56. It will be noted that the ground wire 90 connected to the backing electrode 23 does not form a part of the instant circuit and that the D.C.-circuit therefore has components which are both above and below the ground potential.

In this circuit, the capacitor 86, as before, may have a capacitance of .02 mfd., and serves to eliminate any voltage ripple due to rectification or internal resistance variation.

The resistance 88 also serves as a load resistor for the secondary 65, there being a pair of blocking capacitors 69 and 91 provided intermediate the secondary 65 and the resistance 88, each of which has a capacitance of .025 mfd.

The A.C.-circuit extends as described before through the conductor 89 from the ungrounded end of the secondary 65 to the record electrode 22, and thence through the record medium 14 to the backing electrode 23. By the provision of a bypass capacitor 92 having a capacitance of .00025 mfd. across the prebias position, the return path for the A.C.-signal may extend from the backing electrode 23, through the capacitor 92 and the capacitor 86, the resistance 87 and the capacitor 91 back to the secondary 65. Thus it is apparent that the ground lead 90 is not necessary to complete the alternating current circuit.

Figure 13:
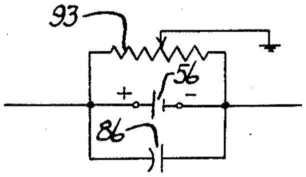
FIGURE 13 is a fragmentary diagrammatic view of a modification which may be applied to the circuit of FIGURE 12.

This circuit requires that good insulation be used for the portions of the circuit wherein direct current is carried to preclude D.C.-leakage currents to ground which would thereby unbalance the direct current through the electrodes. In the event that there is a slight leakage current so that there is current flowing in the ground lead 90, a variable potentiometer 93 may be connected across the power supply 56 as shown in FIGURE 13, its wiper being grounded. Thus by positioning the wiper of the potentiometer 93, it is possible to balance the potentials such that there is less than 0.01 microampere flowing in the ground lead 90. The potentiometer 93 thus is used substantially the same as the variable leg of a Wheatstone bridge. As before, it will be noted that an R-C circuit is thus provided which loads the secondary, which limits the current in both of the A.C. and D.C.-circuits, and which mixes the A.C.-signal into the D.C.-circuit.

Referring now to FIGURE 14, there is shown a circuit which is slightly more refined than that shown in FIGURE 9. It will be noted that the amplifier 66 and the output transformer 63 are connected as before, and that the electrodes are arranged substantially as indicated in FIGURE 9. However, in this form, the ground from the prebias electrode 21 and the capacitor 61 is a conductor 94.

The D.C.-circuit originates with the power supply 56, the positive terminal of which extends to the load resistor 68, which has a slight current limiting effect, and thence to an additional current limiting resistor 95 having a resistance typically between one and twenty megohms, and thence to the record electrode 22. As before the direct current circuit extends from the record electrode through the record medium 14 to the backing electrode 23, again through the record medium 14 to the prebias electrode 21 and then via an additional optional current limiting resistor 96, having a resistance between zero and one hundred megohms, and thence via the conductor 94 to the negative terminal of the power supply 56. Since the negative terminal of the power supply 56 is grounded, each of the capacitors shown in the circuit serves as a blocking capacitor to prevent short circuiting of the D.C.-power supply.

The resistance 68, as before, serves as a load across the secondary 65 and is connected thereto by a pair of coupling capacitors 97 and 98. The capacitor 97 has a capacitance of .005 mfd. or more and the capacitor 98 has a capacitance of .03 mfd.

The A.C.-circuit extends from the one end of the secondary 65 through the current limiting resistor 95 to the record electrode 22 where the A.C.-signal is superimposed on the D.C. as it passes through the record medium 14. After passing therethrough to the backing electrode 23, the A.C.-current is bypassed through the capacitor 61 connected to the return lead 94.

The D.C.-series back-electrode connection ensures that the D.C.-component of the tape's motional current carried by the recording bias electrodes shall be the same as that carried by the prebias electrodes and that the two shall be in opposite directions through the tape.

The single D.C.-voltage source suffices since the two electrodes' voltages are divided automatically by the impedances of the tape to the equal motional currents of the two sets of electrodes. The tape threshold voltage and the tape's internal voltage after leaving the prebias electrodes are also factors contributing to this voltage division.

Figure 15:
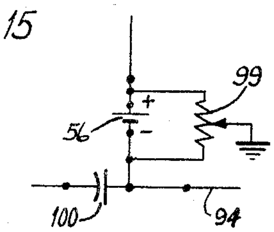
FIGURES 15 and 16 are each fragmentary diagrammatic views of modifications which might be applied to the circuit of FIGURE 14.

When the circuit of FIGURE 14 is used as shown, the D.C.-voltage distribution at the two electrode positions is substantially the same as described in behalf of FIGURE 9, whereby the D.C.-voltage of the back electrode 23 is about 900 volts with respect to ground. However, in the event that it is desired to have a different D.C.-voltage to ground at the backing electrode 23, a potentiometer 99 may be placed across the power supply 56 as shown in FIGURE 15, the wiper being grounded. This having been done, a capacitor 100 should be added as shown to isolate the transformer ground from the potentiometer ground, its value not being critical. The potentiometer also provides for a relatively low time constant for the decay of capacitor voltages when the D.C.-source is disconnected.

Figure 16:
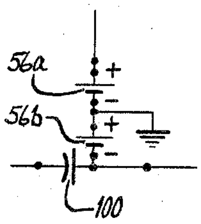

FIGURE 16 shows a similar circuit wherein two power supplies 56*a* and 56*b* are connected in series and a ground is provided intermediate the power supplies. It will be noted that the results obtained by the modification of FIGURE 16 are the same as those shown in FIGURE 15 except that the adjustability feature is not present.

It will be understood that the capacitor 61 connected to the backing electrode 23 may have a somewhat greater capacitance such as .002 mfd. However, it is preferred that a small value of capacitance be used at this point so that if it is discharged by direct engagement between the backing electrode and one of the other electrodes, the actual discharge current which flows would be negligible, and thereby not damaging to the engaging surfaces or edges.

It will be apparent that the electrode structure shown in FIGURE 3 may be utilized with any one of the several circuits illustrated herein. In several of these circuits, one of the electrodes may be grounded, and a somewhat simpler form of head may be utilized if desired. Illustrative of this is the form or embodiment shown in FIGURE 17. In this form, the record electrode 22a is carried by an insulative support member 33a which in turn is secured as by screws to a conductive bracket or plate 101 secured to or comprising a part of the case 20.

Figure 17:
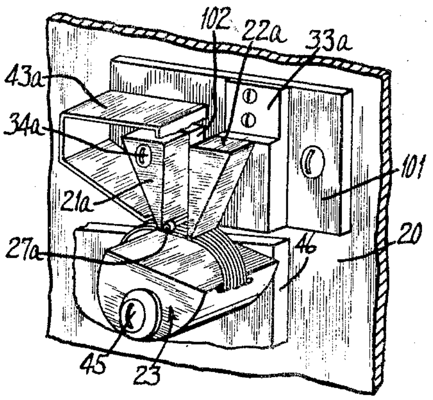
FIGURE 17 is a fragmentary view generally similar to FIGURE 3 showing a modified electrode structure.

The exact mode of attachment of the individual electrodes is optional, the record electrode 22a here illustrated being cemented to the insulative support 33a. The prebias electrode 21a is disposed within a shield 43a which is carried by and is electrically common with the conductive bracket 101. In this embodiment, the prebias electrode 21a is secured as by a screw 34a to the conductive plate 101. If desired, a spacer 102 may be interposed therebetween. In this embodiment, the guide pin 27a is secured directly to the conductive plate 101, such as being pressed therein. The backing electrode 23 is the same as that shown in FIGURE 3. FIGURE 17 further illustrates that the prebias and record electrodes may be made relatively small, and those illustrated in this figure comprise a semi-conductor of ferrite material. An extensive amount of experimentation has shown that of all unplated electrode (knife edge) materials, a ferrite semi-conductor yields the best known performance in the practice of this invention, the ferrite being $$Ni_{0.4}Zn_{0.6}Fe_2O_4$$

the use of which requires shielding of the prebias electrode for best performance. These electrodes have typical resistances, when clean, of 6 and 30 megohms.

While the guide pin 27 has been disclosed as being vertically adjustable in FIGURE 3 and fixed in FIGURE 17, it is to be understood that the guide means may be constructed either fixed or adjustable in other manners.

Referring now to FIGURE 19, there is illustrated an alternate form of providing lateral record medium guidance. In this view, each of the prebias electrode 21 and the record electrode 22 has been provided with a guide plate 103 which is secured to the respective electrode as by the electrode mounting screws 34. Each of the guide plates 103 has at its lower transverse edge a downwardly directed slot 104 which is defined by a pair of confronting shoulders 105 which are spaced apart for receiving the record medium 14 therebetween. It will be noted that the slot 104 extends upwardly above the knife edges 31 and 32. Where the knife edges 31 and 32 are close together, one of the plates 103 may be omitted if desired.

Referring now to FIGURE 20, a still further form of adjustable guide pin is illustrated. In this form, the backing electrode 23a serves to support an upwardly directed arm 106 which is secured thereto by means of a pair of screws 107 and 108. If desired, the screw 45 may be one of these two screws. It will be noted that a substantial annular clearance or slot has been provided at 109 in the arm 106 so that the arm 106 may be pivoted about the screw 107 with respect to the backing electrode 23a and locked in a given angular position by tightening of the screw 108.

The arm 106 supports a tape guide pin 110 which is frictionally carried at the upper end of the arm. The pin 110 has an outer end 111 which is adapted to be rotated such as by a screwdriver, while the opposite end is undercut to define a pair of spaced shoulders 112, 112 between which is disposed the record medium 14. The undercut portion 113 is preferably so made that it is eccentric to the main portion of the pin 100. Therefore, when the pin 110 is rotated, the distance which the record medium 14 will be lifted above the upper surface of the wires 41 of the backing electrode 23a may be adjusted. The backing electrode 41 should be narrower than the tape 14 and centered between shoulders 112 as shown in FIGURE 20.

When the arm 106 is angularly adjusted by pivoting about the screw, 107, there is produced an adjustment which has both a vertical vector and a vector perpendicular to the drawing whereby the pin 110 may be properly positioned for any setting of the adjustment screws 49 and 53 shown in FIGURE 2.

It has already been pointed out that the diameter of the individual wires 41 of the backing electrode 23 is as little as .001" or smaller. It can be appreciated that when a length of such a fine wire is used, which is many times greater than its diameter, the force than can be applied by the wire against the underside of the record medium 14 is relatively light. FIGURE 18 illustrates a method and means whereby the force exerted by the backing electrode wires 41 may be increased. In FIGURE 18 there is shown a structure which is identical to that shown in FIGURE 3 except that a magnetic field has been added to the electrodes. Since there typically is a 1500 volt D.C.-potential between the electrode 21 and the electrode 22, a thin insulative sheet or coating 114 is disposed at at least one of the electrodes 21 and 22. The drawing in FIGURE 18 represents the use of insulative material comprising Mylar having a thickness of .001". When a magnetic gap this small is provided, there is a very small loss of magnetic strength. A magnetic field in then provided such as by means of a permanent magnet 115 which is so disposed and arranged that the magnet attaches itself to the electrodes 21 and 22. It is to be understood that when this feature is utilized, electrodes 21 and 22 must comprise magnetic material, such as nickel. Further, it is preferable to use nickel as material from which the wires 41 are made, nickel being preferred since it is ferromagnetic and since it is corrosion resistant. For operativeness, however, any material exhibiting ferromagnetic properties may comprise the magnetic path. The magnetic path extends from the poles of the magnet 115 through each of the electrodes 21 and 22, through the record medium 14 and through the wires 41. The knife edges 31 and 32 provide concentrated points of flux density, which act through the record medium 14 to attract the wires 41 against the bottom surface of the record medium 14, thereby aiding them in pressing against such surface and increasing the unit contact force at each wire. An advantageous structure will also achieve this result when one or both of the electrodes 21 and 22 are inherently magnetic or are provided with a magnetic field, even though a complete magnetic circuit is not made through the wires 41. Thus, the electrodes 21 and 22 may have like magnetic polarities disposed adjacent to the wires 41.

It is recognized that the arrangement illustrated may also provide an electrostatic capacitance between the prebias and record electrodes, and that the magnetic field may have some deflective effect on the injected charges. It is not known whether either of these conditions is present.

It will be noted that there are several features of novelty each of which coacts with the others to produce an improved electrostatic recording system and method. Thus each of the circuits provides the novel step of passing a D.C.-bias current through the record medium at each of the electrode positions such that the current at the one electrode is equal to the current at the other electrode. While this step may be accomplished by various structures or means, the novel common backing electrode disclosed herein provides a convenient means for insuring that the D.C.-current through the prebias electrode is identical to that in the record electrode. Still further, various electrodes, and structures for guiding the record medium therethrough, have been provided. Still further, a method and means has been provided for positively neutralizing any electrostatic surface charges, and for treating the record medium.

FIGURES 24 and 22 illustrate another recording apparatus for practicing the present invention. The reference numeral 14 designates the tape record medium which is unwound from the supply reel 11 and drawn through the metal shield case 20*a* containing the recording head assembly by means of a capstan drive roller 25*a* and shiftable rubber pinch roller 26*a*. The tape is then wound on a suitable take-up reel (not shown). A tape guide pin 15*a* and pulley or roller 16*a* are illustrated for guiding the tape in its travel between the supply and take-up reels.

The recording head assembly within the shield case 20*a* is illustrated in detail in FIGURE 22 wherein the cover of the case has been removed. It will be observed that the tape 14 enters the case 20 through a slot 29*a* and leaves the case through a slot 30*a*. Within the case, the tape travels first through a bias or erase head 19 and then through a recording head 28.

The heads 19 and 28 are substantially identical and each comprises a steel block 130 having an integral knife edge electrode 131 engaging one side of the tape and a semi-cylindrical conductive block 40 having a multiplicity of steel wires 41 extending arcuately from the block 40 into engagement with the undersurface of the tape 14. The lower electrode blocks 40 are mounted on arms 138 which are pivotal on screws 139 to accommodate movement of the wires 41 toward and away from the tape 14. Adjustment cams 142 are mounted on screws 143 for determining the upper limit position of the arms 138. To thread tape through the assembly, the screws 139 are loosened and the arms 138 are pivoted downwardly. After the tape has been threaded through the assembly, the arms 138 are pivoted upwardly into engagement with the adjustment cams 142 and then clamped in this position. The angular position of the cams 142 is selected so that the wires 41 resiliently press the tape against the knife edge electrode 131 with the desired tension. It will be understood, of course, that the parts just described are all suitably insulated so as to prevent the applied voltages on the electrodes from charging the casing 20*a*.

With respect to the upper knife edge electrodes shown in FIGURE 22, both mild and high temper stainless steels have been used, the latter better resisting the wearing action of the tape. The best quality of knife edge is obtained by fine grinding and then polishing the edge surfaces 148 and 149 to a high finish. It is desirable to utilize a material that will be hard, to resist wear, yet have low friction for reducing drag on the record and a low vapor pressure for reducing the effects of occasional sparking through the tape. Edge angles between the surfaces 148 and 149 of 30°, 45°, and 60° have been found satisfactory, but an angle of 90° between the surfaces 148 and 149 gave a definitely muffled quality to the playback of signals in the arrangement illustrated in FIGURE 22. From the standpoint of tape wear and of tape guidance it has been found best to have the knife edge 131 slightly wider than the tape. For example, with a ¼ inch wide tape, the knife edge 131 may have a width of 17/64 of an inch. A very great improvement was found to result from adding flat plates such as illustrated at 152 and 153 to the parallel ends of the knife edge electrode to form a guide for channeling the lateral edges of the tape as it travels through the head assembly. The incorporation of a tape guide such as illustrated at 152 and 153 carried with the knife edge 131 is regarded as an extremely important feature of the head assembly for trouble-free guiding of the tape through the head assembly.

The wire backing electrodes such as shown in FIGURES 22 and 23 must have a width sufficiently less than the width of the tape to insure that all of the wires of the backing electrode will continually ride on the tape with an adequate margin of tape at each side of the backing electrode to provide high voltage insulation between the backing electrode and the knife edge electrode which engages the opposite side of the tape. For example, a width of .16 inch to .18 inch for the wire backing electrode is preferred for a tape having a width of ¼ inch ±1/64 inch (manufacturing tolerance).

While originally a tape guide pin was positioned as indicated in dotted outline at 160 over which the tape ran between the heads 19 and 28, it was found that operation of this embodiment was improved by omitting this pin, and providing a free span of tape as indicated at 161 between the heads 19 and 28, and not allowing the tape to ride over any intervening object between the heads.

It has been found that the lower wire electrode as illustrated in FIGURE 22 is highly advantageous and greatly improves the quality of reproduction. It is found that when the wire electrode of FIGURE 22 is used, pressure contact is obtained at a large number of points on the tape because each individual wire 41 of the lower electrode presses a corresponding point of the tape against the knife edge. In the embodiment of wire electrode illustrated in FIGURE 22, each end of the wire is secured in good conductive relation to the conductive block 40, and the individual wires 41 are free to deflect inwardly slightly as they press the tape against the knife edge 131. In the modification illustrated in FIGURE 23, only one end of the wires 41′ is secured to the conductive block 40′, but the wires are arced in such a manner as to ideally make point contact with the lower surface of the record member 14 in the same manner as in FIGURE 22. The wires 41′ are of sufficient stiffness so as to resiliently urge the tape 14 against the knife edge 131 in the same manner as the wires 41 of FIGURE 22. The block 40′ would be mounted in exactly the manner illustrated for the block 40 in FIGURE 22 and its action would be substantially the same as the wire electrode shown in FIGURE 22.

While FIGURE 22 illustrates the use of two heads 19 and 28, it will be understood that only one head can accomplish recording in accordance with the present invention. For example, the tape may first be passed between a single pair of electrodes to prebias the tape, and the tape can then be passed through the same pair of electrodes a second time to record on the tape. Further, of course, the prebias step may be omitted, and recording accomplished by passing the tape through a single pair of electrodes only once. In recording with the use of prebias with a single pair of electrodes, the polarity of the electrodes may be reversed for recording or the tape inverted after prebias and before recording so that the negatively prebiased region of the tape produced by a knife edge such as 131 travels adjacent the lower wire electrode during recording. However, it is not necessary that the prebias and recording be done with voltages of opposite polarity since, for example, it is possible that recording may be carried out with the knife edge, such as 131 of a single pair of electrodes, positive both during prebias and recording.

It is found that the double head of FIGURE 22 besides being more convenient than a single head when prebias or erase is involved, further provides a material improvement in signal-to-noise ratio, possibly by eliminating handling of the tape between prebias and recording operations.

FIGURE 5 illustrates diagrammatically the condition of the tape 14 after it has been prebiased by travel through the head 19 of FIGURE 22. To form the tape of FIGURE 5, a negative voltage is applied to the knife edge 131 of the head 19 so that electrons are injected into an internal region of the tape near the top side or surface 54. Similarly in FIGURE 5, the wire electrode is positive so that an internal region of the tape near the lower surface or side 55 thereof will receive a corresponding positive charge. If the prebias voltage is maintained at a constant non-fluctuating value, the charge per unit length along the tape in the region near each surface should be substantially constant.

When the prebiased tape illustrated in FIGURE 5 travels over the recording head 28, the charge pattern along the tape is altered so that the charge distributions in the upper and lower portions of the tape vary in accordance with the signals applied to the recording head, as illustrated in diagrammatic form in FIGURE 6.

It is found that the maximum output and maximum signal-to-noise ratio and least distortion are obtained for a prebias voltage of about −1000 volts and a recording bias voltage of about +600 volts. (Throughout this description, a bias voltage is given a negative sign when the negative side of the bias voltage source is connected to the knife edge electrode.) The signal voltage may, for example, have a maximum amplitude of about 300 volts for a direct current recording bias of 600 volts; however, a maximum signal amplitude of 200 volts is preferred.

In the case where recording takes place without prebias, a suitable recording bias would be in the neighborhood of 880 volts.

The recording bias may be of either polarity, but if the tape has a previously recorded signal thereon, the polarity on re-recording should be opposite to that used in the previous recording to insure erasure of the previous record. The polarity is reversed for re-recording either by inverting the tape or by reversing the polarity of the recording bias voltage applied to the electrodes.

In recording, it is considered to be highly desirable to have a solid state electrode in intimate contact with the record medium so as to facilitate the injection of charges into the tape. However, for playback, electrode contact with the tape is not required, since no charge crosses the tape-electrode boundaries and the charged tape produces current flow in the electrode circuit by induction simply by virtue of the varying charge distribution along the tape.

FIGURE 25 illustrates a preferred recording circuit for use in conjunction with the head assembly of FIGURE 22. It will be observed that the prebias voltage is applied to the electrodes 19 by means of the shielded leads 170 and 171. The shielding is represented at 173 and is indicated to be grounded to the shield casing diagrammatically indicated at 20*a* in FIGURE 25. A negative voltage is applied through the conductor 170 to the knife edge electrode designated generally by the reference numeral 180 of the head 19. The negative terminal of the prebias power supply is preferably grounded as is the shield case 20*a*. Positive potential is applied to the wire or backing electrode of the head 19 which is designated generally by the reference numeral 181. Recording bias is applied by means of conductors 184 and 185. The conductor 185 is connected through secondary 186 of transformer 187 with the grounded positive terminal of the recording bias power supply and leads to the knife edge electrode designated generally by the reference numeral 188 while the conductor 184 is connected with the negative side of the recording bias power supply and leads to the backing electrode 189 of the recording head 28. The signal is illustrated as being introduced by means of the transformer 187 which is coupled to the transcription amplifier 66. The amplifier receives a suitable input at 67. A resistor 195 is connected across the secondary of the transformer 187 to insure that the transformer operates into its proper load impedance. It is considered preferable to have the knife edge 188 of positive polarity when recording on "Mylar" tape with the illustrated circuit although this is not a necessary condition.

In the illustrated circuit, series resistors 201 and 202 have the function of protecting the electrodes from the effects of sparking or arcing in case of accidental contact or tape spark-through. Resistors 201 and 202 preferably are of the order of 2% of the minimum "motional ohmic resistance" of the tape. Shunt resistors 203 and 204 are provided so that the signal and bias sources operate into a substantially constant load resistance. Series resistors 205 and 206 protect the prebias and bias sources from accidental overload.

In the illustrated embodiment, the circuit components have the following values:

| | Ohms |
|---|---|
| Resistor 195 | 100,000 |
| Resistor 201 | 2,200,000 |
| Resistor 202 | 2,200,000 |
| Resistor 203 | 2,200,000 |
| Resistor 204 | 2,200,000 |

Transformer ratio: primary to secondary 1:50.

For playback the conductors 170, 171, 184 and 185 may be disconnected from the head assembly as by means of suitable terminals carried by the shield case 20*a* and the shielded cable 62 connected to the amplifier 66 as shown in FIGURE 10 and the electrodes 188, 189 as shown in FIGURE 26. The backing electrode 189 is preferably shorted either conductively or capacitively to the case 20*a*, a conductive short being indicated at 123. In the embodiment illustrated in FIGURE 26, the electrodes 188 and 189 are in resilient engagement with the record member 14 in the same manner as during recording. Alternatively, however, one or more of the electrodes may be spaced from the record member during playback.

It may be noted that in the preceding portion hereof the symbols "D.C." and "A.C." have been used to represent direct current and alternating current respectively. The term "mil" used herein refers to .001 inch. The symbol " has been used for inch. The symbol "mfd." stands for microfarad, the symbol "db" stands for decibels, and the symbol "c.p.s." refers to cycles per second.

ELECTROSTATIC RECORDING THRESHOLD POTENTIAL

FIGURE 28 illustrates the experimental results obtained when Type A Mylar tape of different thicknesses is moved between a pair of contacting metal electrodes such as shown at 180 and 181 in FIGURE 22. The dielectric coefficient of the material employed was about 3.2, and the tape was moved at a uniform speed of 15 inches per second.

Curves 300, 301 and 302 represent the observed electrode currents, as they might be measured in conductor 170 or 171 in FIGURE 25, for example, at different electrode voltages, measured directly between the electrodes such as 180 and 181, during uniform motion of an initially uncharged tape between the electrodes. The ordinate values in FIGURE 28 actually represent the product of electrode current in microamperes and tape thickness in mils (1 mil=.001 inch) divided by .0117. Curve 300 is taken for a tape thickness of .25 mil, curve 301 for a tape thickness of .50 mil and curve 302 for a tape thickness of 1.0 mil. Thus the ordinate values in FIGURE 28 must be multiplied by .0468 to obtain the measured values of electrode current in microamperes for curve 300, must be multiplied by .0234 for curve 301 and by .0117 for curve 302. Extrapolating from the linear portions of curves 300, 301 and 302 gives extrapolated threshold potentials of about 670 volts, 730 volts and 850 volts, respectively. It will be observed from FIGURE 28 that below voltages of about 560 volts for .25 mil Mylar, 650 volts for .50 mil Mylar and 700 volts for 1.0 mil Mylar, there is substantially negligible electrode current, while above these incipient or transitional threshold potentials, there is a characteristic rising electrode current as a function of electrode voltage.

When signals are recorded by means of electrode voltages substantially below these transitional threshold potentials, the recorded charges are found to be in the nature of surface charges, so that the recorded signal can be readily erased by placing grounded metal electrodes in contact with the opposite surfaces of the tape, or by drawing the tape between electrodes such as 188 and 189 in FIGURE 26 to reproduce the recorded signal. Wiping a cloth or tissue paper over the surface of the tape will permanently smear such a subthreshold recording. Further such a subthreshold recording is permanently erased when subjected to the ion atmosphere of an ion generator such as indicated at 18 in FIGURE 27.

Recordings made with electrode voltages above the incipient threshold potential on the other hand, when electrode configuration as herein disclosed are utilized, are found to be relatively stable and permanent. Placing grounded metal plates in contact with opposite surfaces of the recorded tape, drawing the recorded tape between contacting metal electrodes and wiping the surfaces of the recorded tape with a dielectric material do not substantially affect the recorded signal. As a consequence, the recorded tape may be wound on reels and stored for long periods of time before playback, and may be repeatedly reproduced by means of contacting metal electrodes. In fact, quite unexpectedly, the ion treatment of an above-threshold recording does not erase the recorded signal, but on the contrary has been found to have a surprisingly beneficial effect on the signal to noise ratio of the reproduced signal.

Curve 305 illustrates the electrode current-voltage relationship at a pair of electrodes 188 and 189 for a .25 mil Mylar tape having a dielectric constant of 3.2 which tape has priorly received a prebias charge by means of electrodes such as 180 and 181 in FIGURE 25 having a voltage of −1000 volts therebetween. In this case the extrapolated threshold voltage is about +180 volts and the transitional or incipient threshold voltage is about +100 volts. When signal voltages are superimposed upon bias voltages above the incipient threshold value for a given prebiased tape, the recorded signal is found to be relatively stable and permanent and is not erased by contacting grounded metal plates, contacting playback electrodes, wiping with dielectric material, or by ion atmosphere treatment.

It appears from the experimental evidence that the significant factors in achieving such a stable and permanent recording are the presence of substantially opposite air gaps between each electrode and the adjacent tape surface and potential differences across said air gaps correlated with the length of said gaps so as to produce gaseous ion charging of each of the opposite surfaces of the tape substantially simultaneously. It presently appears that air gaps of at least about .3 mil between the electrodes and the adjacent surfaces of the record medium are required for gaseous ion charging of a dielectric record medium between the electrodes at atmospheric pressure. For the electrode configurations illustrated herein, frontal ionization gaps are provided at the leading and trailing sides of the knife edges of frontal electrodes such as 180 and back ionization gaps are provided adjacent the points of contact between the tape and the wires of backing electrodes such as 181. The frontal and back air gaps in the illustrated embodiments are arranged substantially directly opposite each other with respect to the path of the tape to provide substantially simultaneous application of charge to the opposite sides of the tape. It will be noted that the frontal electrode 180 tends to wipe any surface charge from the tape surface engaged thereby. However, charge deposited on the tape at the leading side of the frontal knife edge may be driven below the surface of the tape by the intense field provided by the frontal electrode which is in pressure engagement with the tape. The backing electrode has gaps therein between the successive wires so as to insure a uniform transfer of charge to the back surface of the tape under all operating conditions.

Of the two grades of Mylar available from the trademark proprietor, type A and type C, Mylar C has been found to have the better electrostatic recording properties. Mylar C ¼ mil tape is used in obtaining curves 305 and 306 of FIGURE 28A. It will be noted from curve 306 that the extrapolated threshold voltage measured at a speed of 3.75 inches per second is about 560 volts for type C Mylar.

ELECTRODE CONFIGURATIONS

By way of example of an electrode configuration differing from the preferred examples previously given, two .025 inch diameter hardened steel chromium plated pins were used for the prebias and recording bias electrodes in place of the usual form of sharp knife-edge electrodes. The pins, in effect, constituted two very blunt knife-edges.

Current-voltage data gave an extrapolated threshold voltage for the motional tape current of a little less than 500 volts. This was at least 50 volts lower than any previously observed value for threshold voltage.

Frequency response data obtained at a speed of 11.25 inches per second showed the frequency of greatest playback output to be approximately 200 cycles per second as compared with 800 to 1200 cycles per second usually observed at this speed when using sharp knife-edges such as described in connection with FIGURE 2. The signal to noise ratio was only 10.6, or 20.5 decibels, at the optimum frequency and dropped to 2, or 6 decibels, at about 1000 cycles per second. The highest signal to noise ratio yet found for sharp knife-edges is 137.8, or 42.7 decibels, at 800 cycles per second, with 3.9, or 11.8 decibels, at 6,400 cycles per second on the same test; this was for a speed of 11.25 inches per second. Common values are 6 decibels below these figures.

In the present test, the pin-electrode radius (0.0125 inch) corresponded to about a quarter wavelength of the optimum frequency for the tape speed of 11.25 inches per second.

As another example of an electrode configuration, an electrode was made from a section cut from a new Rolls Hollow Ground Razor Blade made of Sheffield steel. A 5/16 inch x ¼ inch section was cut from the original blade and soft soldered into a piece of brass machined to the proper shape for adaptation to the recorder head in place of the recording knife edge in the system of FIGURE 2. Good frequency response recordings were obtained with high signal to noise ratios. The blade was exceedingly sharp (too sharp) causing the tape to be cut occasionally when splices or markers passed through the head.

Razor blade knife edges of the type described above were plated with chronium to give edges of approximately .0005 inch radius. Initially, an optimum signal to noise ratio of approximately 28, or 29 decibels, was found at a signal frequency of about 600 cycles per second. The signal to noise value for these knife-edges before plating was 100 or 40 decibels at an optimum frequency of 800 cycles per second.

In the condition the chromium plated knife edges were first received and used, numerous growth-like spots appeared on the plated surfaces as imperfections. After removing these by careful lapping, an optimum signal to noise ratio of 54.2, or 34.7 decibels, was obtained at 800 cycles per second.

The inference drawn from the blunt knife-edge experiments described above is that a sharp edge favors both a high frequency response and a high signal to noise ratio.

An experiment was conducted to see if a detectable signal (of 100 cycles per second) could be recorded on a moving tape that was separated, by stationary pieces of similar tape, from the knife-edge electrodes on one side and from the backing electrode on the other. Approximately the same electrode voltages were used as were used in the three-ply tape experiment previously described in which three thicknesses of quarter-mil Mylar tape were run between the electrodes. A recording bias of 910 volts was used and a 100 volt (R.M.S.) signal. Good signals of substantially the same strength were obtained on each of the three tapes in this earlier three-ply tape experiment. In the present experiment, where the two outer tapes were stationary, no detectable signal could be found on the active middle tape.

The dependence of playback signal voltage on the number of backing electrode wires of the recording head was determined using two ferrite knife-edges and a single backing electrode. Starting with 76 wires in the backing electrode, a few were out off at a time. An 0.2 minute recording of an 800 cycles per second signal voltage was made at each step, followed by a no-signal interval of also 0.2 minute. Later, playback was made using a regular 175 wire backing electrode. Signal voltage, $v$ was plotted against the number of backing electrode wires, N. The data appears to be best represented by a straight line which intercepts the N-axis at $-5$ turns. Thus, the effect of any N turns appears to be linear with respect to $N+5$ turns, so that the playback signal voltage is given by $$v=.0141\ (N+5)\ \text{millivolts.}$$

The physical interpretation for this result is that when a single turn is used, the rate of change in electrostatic capacity between the layers of injected charges corresponds to a rate of change in area that is not simply the width of one turn times tape speed but to a rate of change in area that is 6 times this width times tape speed. The effect is probably due to a combination of a normal "end effect capacity" and charge diffusion within the tape in the neighborhood of the turn or turns; this extends to an effective distance of 2.5 wire diameters on either side of the backing electrode wire or wires.

A backing electrode made of 250 turns of .0005 inch diameter tungsten wire has been found to provide excellent results, but with no marked difference in performance when compared with the results obtained for the .0007 inch wire, 200 turn electrode.

When the size of wire used in the half-inch diameter backing electrode was reduced to 0.0005 inch, it was found that the wires tended to lay over and also to "stray" when pressure was applied to the tape. For this reason, the winding diameter was changed to ⅜ inch with entire satisfaction. However, when 0.0007 inch wire is used in this winding diameter, the backing electrode becomes too stiff, resulting in excessive tape friction. Thus, the choice of backing electrode diameter seems somewhat critical with respect to the size of wire employed.

It has been found advantageous to wind the backing electrode wires on a polystyrene support rather than on one of metal. Besides being easier to wind, the polystyrene support requires no additional insulation and reduces the electrical capacity of the backing electrode.

MOTIONAL TAPE CHARGING CURRENTS

The experimental arrangement in FIGURE 29 shows a tape of thickness $S_0$ and dielectric constant K being drawn at a speed $u$ between a chromium plated knife-edge (P) and a backing electrode of effective width $w$. The backing electrode comprises 200 turns of .0007 inch diameter tungsten wire wound on a ½ inch diameter. A $10^6$ ohm shunt and electrometer are connected to measure current $I_1$ that may be produced by a voltage V when the tape is in motion at the speed $u$. It is found experimentally that no appreciable current is obtained until the applied voltage exceeds a certain intercept threshold voltage $V_t$. Thereafter, we may assume that the effective voltage $v$ is given by $$v=V-V_t \tag{1}$$

Because of the injection of charge into the tape, the effective thickness S will be less than the tape thickness $S_0$. Suppose the tape to move a distance $dx$ in time $dt$; then an electrostatic capacity $dC$ of amount $$dC=\frac{1}{4\pi}\frac{Kw}{S}dx\ (\text{e.s.u.}) \tag{2}$$

will be charged to the voltage $V-V_t$ in the time $dt$, and the corresponding charge $dq$ transmitted to each side of the tape will be $$dq=(V-V_t)dC$$

or $$dq=\frac{1}{4\pi}(V-V_t)\frac{Kw}{S}dx\ (\text{e.s.u.}) \tag{3}$$

and the circuit current will be $$I_1=\frac{dq}{dt}=\frac{1}{4\pi}(V-V_t)\frac{Kw}{S}\frac{dx}{dt}\ (\text{e.s.u.}) \tag{4}$$

If S and W are in inches and $$\frac{dx}{dt}(=u)$$

is in inches per second, Equation 4 becomes $$I_1=0.2246\times10^{-6}(V-V_t)\frac{Kwu}{S}\ \text{microamperes} \tag{5}$$

An experimental curve of this penetration current ($I_1$) plotted against V for connections $a$, $a$ in FIGURE 29 is shown in FIGURE 30, where the inferred or intercept threshold voltage, $V_t$, is 635 volts. When a backing electrode of many close-wound fine wires is used, as here, the linearity of the curve is well defined and deviates from a straight line only at its extreme lower end.

Evidence supporting the view that the charge separation distance S is less than the tape thickness $S_0$ is found in the fact that the experimental value for $I_1$ is always more than obtained by Equation 5 when computed on the assumption that $S=S_0$. This is true even when a reasonably over-sized value is used for the effective width, $w$. It has been found, experimentally, using widely spaced wires in the backing electrode, that the effective width of a single wire increases with applied voltage, and may become as much as 15 wire diameters at $V=900$ volts. Hence, for a close-wound winding an end-effect increase in backing electrode width may be of the order of 0.010 inch making 0.170 inch a likely value for the effective width $w$ of the backing electrode used in the experiment of FIGURE 29. At $V=900$, in FIGURE 41, the current $I_1$ is 1.85 microamperes. Substituting these values, with $w=0.170$ and $u=11.25$, into Equation 5 and solving for S yields $$S=\frac{0.2246\times10^{-6}(900-635)\times3.2\times0.170\times11.25}{1.85}$$

or $$S=0.000197$$

Thus, it is found that $S\approx0.00020$ inch, whereas $S_0=0.00025$ inch.

Additional experiments indicate that $S/S_0$ tends to be independent of V for $V>V_t$ which suggests that S may be an effective separation identifiable with a particular space-charge distribution function characteristic of this type of current conduction.

MOTIONAL TAPE ESCAPE CURRENTS

Further evidence that charges actually penetrate into the tape is found in the fact that when the electrode voltage exceeds about twice the threshold voltage, charges begin to escape from the tape if a pair of shorted electrodes is provided as shown at B in FIGURE 29. It is to be observed that when the tape leaves the first knife-edge (at P) the voltage between charged layers (regardless of what separation one chooses to assign) is $V-V_t$, so that, when $V>2V_t$, charges may be expected to leave the tape at shorted electrodes if the threshold effect is bilateral. Experimentally, the $I_2$-curve of FIGURE 41 shows that this bilateral behavior does indeed exist and that the internal tape voltages due to layers of charge appear to produce ejection or escape currents in much the same way as external voltages produce the initial injection or penetration currents. The fact that the slope of the $I_2$-curve is slightly less than for the $I_1$-curve suggests that the effective width of the backing electrode $w$ is slightly less for escape currents where both electrodes are at ground or near-ground potential than for the penetration or injection currents where the actual electrode (knife-edge) potential may be quite high. The possibility of escape currents must be avoided in electrostatic recording.

In another experiment related to the escape current effect, chromium plated razor blade knife edges as previously described herein were used, each having an edge radius of about .0005 inch; that is, a radius about equal to that of the backing electrode wires employed. The backing electrode for this experiment consisted of five parallel 0.001 inch diameter nickel wires separated 0.030 inch. The electrode assembly and circuit are shown in FIGURE 31. Batteries were used for the voltage supply and all circuit elements were thoroughly insulated by Teflon or polystyrene to prevent leakage currents to ground. Connections *a*, *a* in FIGURE 31 were used for the measurement of *injection* currents and connections *b*, *b* for the measurement of *ejection* currents.

For the *a*, *a* connection, injection currents $i_1$ were produced by the battery voltage V, more batteries being connected in series when more voltage was wanted. There is no ejection current for this connection. For the *b*, *b* connection, the ejection currents $i_2$, now under measurement, were produced by the voltage difference between the two layers of injected charge received by the tape as it passed between the first knife-edge and the backing electrode. For the measurements of $i_1$ and $i_2$ (for either the *a*, *a* or *b*, *b* connection) a Keithly $10^6$ ohm shunt and electrometer combination was used.

Two complete experimental runs were made. In the first, battery voltages V were increased step by step and in the second they were decreased in reverse order. In each run, for a given battery voltage, the maximum and minimum values of $i_1$ and of $i_2$ were observed over an interval of 0.2 minute or more and the results recorded. The averages of corresponding maximum and minimum readings were computed for each voltage V and for each run. Later, over-all average values of $i_1$ and of $i_2$ (for the two runs combined) were determined. These are tabulated against their corresponding values of V in the table herebelow.

*Current-Voltage Data for Mylar Tape Using a Five-Wire Backing Electrode, Having Wires Separated 30 Diameters*

| V (Volts) | $i_1$ (Microamperes) | $i_2$ (Microamperes) | V–670 (Volts) | $i_2/i_1$ |
|---|---|---|---|---|
| 360 | .000 | --------- | ----- | ----- |
| 460 | .003 | --------- | ----- | ----- |
| 550 | .045 | --------- | ----- | ----- |
| 640 | .11 | --------- | ----- | ----- |
| 735 | .21 | --------- | ----- | ----- |
| 755 | .29 | --------- | ----- | ----- |
| 845 | .46 | 0.005 | 175 | ----- |
| 935 | .70 | .009 | 265 | .000 |
| 1,025 | 1.07 | .008 | 355 | .0075 |
| 1,115 | 1.55 | .021 | 445 | .0135 |
| 1,125 | 1.55 | .024 | 455 | .0155 |
| 1,220 | 1.92 | .042 | 550 | .022 |
| 1,310 | 2.65 | .105 | 640 | .040 |
| 1,395 | 3.1 | .232 | 725 | .075 |
| 1,485 | 3.6 | .370 | 815 | .103 |

The meter readings of $i_1$ and $i_2$ were both positive for the circuit arrangements of FIGURE 42 showing that whereas the currents $i_1$ were *injection* currents, the currents $i_2$ were in the opposite direction within the tape and hence were *ejection* or escape currents. The ratios of $i_2$ to corresponding $i_1$ are tabulated in column 5 of the above table.

Values of $i_1$ and $i_2$ from the table were plotted against V and the ratios $i_2/i_1$ were plotted against V. The $i_2$ curve has nearly the same form as that of $i_1$ but is displaced by 670 volts. This has been demonstrated by plotting the $i_2$ data also against $V-670$. These latter points substantially agree with the curve of $i_1$ versus V. Thus, it appears that the internal tape voltages due to layers of internal charges produce the *ejection* currents in much the same way that external voltages do in producing the initial *injection* currents.

However, when one considers the trend of the $i_2/i_1$ curve, the conclusion is reached that insufficient data are available for completely satisfactory generalizations to be made. Thus, the ratio $i_2/i_1$ appears to approach unity at about 1870 volts, yet from the plots of $i_1$ and $i_2$ this can never occur if the forms of the $i_1$ and $i_2$ curves continue to be the same. This would be explained however, if it could be shown that breakdown can be expected to occur if $i_2/i_1<0.5$ or something of this sort. Concern over possible damage to the knife-edges and/or backing electrode has prevented the tests from being carried closer to the tape voltage-breakdown point which is thought to be in the neighborhood of 1,800 volts.

The plot of $i_1$ versus electrode voltage for the arrangement of FIGURE 31 gives a substantially less linear curve for values of voltage between 700 volts and 1000 volts than the $I_1$ curve of FIGURE 30, for example, which was taken using closely spaced backing wires. The incipient threshold voltage, where appreciable motional current begins to be observed, is about 460 volts instead of about 580 volts as found for curve $I_1$ in FIGURE 30.

ELECTROSTATIC RECORDING EXPERIMENTS IN VACUUM

A special tape drive mechanism was installed in a vacuum bell-jar for obtaining Mylar current-voltage and recording data at pressures of the order of 0.01 microns of mercury.

For the current-voltage experiments, tape was driven (from a roll) at about 5 inches per second, in steps of about 48 inches at a time, by a weight-operated drive. At the end of each step the fallen weight was lifted to its former height by means of a large magnet held against the wall of the bell-jar. For making recordings, a closed loop of tape 33 inches long was similarly driven. Pulley radii were adjusted so that one fall of the weight provided for exactly one turn of the loop. Recording was made on the first passage of the loop and playbacks on subsequent passages.

It was found from the Mylar current-voltage experiments that (1) Currents were obtained.

(2) In magnitude, the currents were approximately one-twentieth of those found at atmospheric pressure when using the same electrodes and tape speed.

(3) The threshold voltage for the vacuum data was the same as had been obtained for the atmospheric data.

(4) The general shape of the two current-voltage curves was the same; that is, when the vacuum current values were plotted using an appropriately decreased scale factor, the vacuum and atmospheric current-voltage curves tended to coincide.

From the fact that the tape charging currents in vacuum were but one-twentieth of those found at atmospheric pressure, one must conclude that gaseous ions play an important part in the transport of charges between the electrodes and the tape. (A visible gas discharge is known to exist and in the dark it may be seen along the tape in the vicinity of the electrodes.)

The data indicate that no more than one-twentieth of the tape area is physically contacted by the electrodes; or, in fact, that the areas of contact plus the areas of immediate charge diffusion within the tape are less than one-twentieth of the full tape area passing between the opposed electrodes. Hence, gaseous discharge appears to provide efficient full-area electrical contact between the electrodes and tape. It is further possible that in air the gaseous discharge may provide for all of the charging current through causing the tape to be fully charged ahead of the actual physical contact with the electrodes.

In the vacuum experiments, the same threshold voltage appears as for air, but in the absence of gaseous discharge. This may suggest to some that occluded gases may be responsible for the vacuum data. However, this is not thought to be so, partly because of the results of the vacuum recording experiments.

In the vacuum recording experiments, the 33 inch Mylar loop, previously mentioned, was given a single twist before joining the ends. The tape, therefore, presented an opposite side to a given electrode at each successive passage of the loop. This simplified recording with prebias and in making erasures for re-recording.

Vacuum recordings were successfully made with this arrangement, both with and without prebias. Signal to noise ratios at least as great as 5 to 1, or 14 decibels, were obtained in both cases. Some recordings, made without prebias and using a low bias voltage, showed the unusual playback behavior of signal-presence only on every other passage of the loop. That is, output signals were obtained only when the tape sides presented themselves to the electrodes in the same aspect as during recording.

For the recordings made with prebias, a D.C. prebias voltage of 900 volts was applied (with no signal) during the first passage of the loop and a D.C. bias voltage of 600 volts was applied, with signal, during the second passage of the loop. At a tape speed of approximately 1.5 inches per second strong signals of 5 to 1 signal to noise ratio were obtained at 100 cycles per second.

Two tests were made using variable frequency in an attempt to arrive at a frequency response limit by noting the point of audible cutoff. In the first of these tests, the recorded signal frequency was increased from 100 to 1000 cycles per second and then back down to 100 cycles per second. On playback of this recording, various observers thought they could follow the frequency tone to about 500 or 700 cycles per second. In a second similar recording the signal frequency ranged from 100 to 500 cycles per second and back to 100 cycles per second. For this recording, the tone remained audible for the entire playback time. Accepting 500 cycles per second as the frequency response limit, the tape signal wavelength was found to be 0.0033 inch per cycle.

It had been thought that the frequency limit would be greater than this. It, of course, could be true that the frequency limit observed was imposed by the system of playback employed, with the actual recorded frequency limit remaining unknown. In any case, the frequency limit found for the vacuum recordings is substantially identical with that found for normal atmospheric recordings.

It was found possible, using the twisted Mylar loop of tape, to erase and re-record numerous times without apparent change in the intensity or quality of successive recordings. Erasure in all cases completely removed the previous signal.

It was observed for the vacum recordings that they could be played back at atmospheric pressure with some reduction in noise. However, in all cases tried no playback signal was obtainable after 24 hours.

EFFECT OF ION GENERATOR LOCATION ON QUALITY OF RECORDING

A group of four test recordings has been made having ions at both positions as usual, at the supply reel only, at the takeup reel only, and with no ions at all.

In the playback and re-winds of these recordings ions were applied just as they were during their preparations. Cathode ray oscilloscope and listening observations perhaps have given more useful information than the routine meter readings of noise and signal output. Summaries of noise and signal output voltages are given in the table below.

*Playback Signal and Noise Output Voltages of Recordings Made With Ions Variously Applied*

| Days After Recording | | (S, T) millivolts | (S, —) millivolts | (—, T) millivolts | (—, —) millivolts |
|---|---|---|---|---|---|
| 4 | Noise | 0.9 | 0.66 | 0.28 | 2.1 |
| | Signal | 14.6 | 12.6 | 16.7 | 15.0 |
| | Sig./N | 16.2 | 19.1 | 59.6 | 8.1 |
| 12 | Noise | 1.08 | 0.76 | 0.32 | 2.1 |
| | Signal | 13.2 | 11.6 | 11.2 | 13.0 |
| | Sig./N | 12.2 | 15.3 | 35.0 | 6.2 |
| 20 | Noise | 0.72 | 0.94 | 0.26 | 2.6 |
| | Signal | 9.6 | 9.6 | 10.1 | 11.3 |
| | Sig./N | 13.3 | 10.2 | 38.8 | 4.3 |

(S, T) Ions at supply reel, S, and at takeup reel, T.
(S, —) Ions only at supply reel.
(—, T) Ions only at takeup reel.
(—, —) No ions used.

The values given are the averages of readings written down rapidly and at random during playback. In general each recording was prefaced by a microphone announcement that lasted a little less than 0.25 minute, followed by the remainder of an 0.5 minute interval, which constituted the period over which noise readings were taken. The 0.5 minute interval of voice-plus-noise was followed by a one-minute signal interval.

The table shows clearly the inferiority of the "no ions" recording and the superiority of the (—, T) reading. The cathode ray oscilloscope revealed that the (S, T) and (S, —) recordings each had strong 60 cycles per second envelope curves, apparently introduced by charge pickup from the supply reel ion generator. These envelope curves were quite regular and appeared to have amplitudes approaching one-half that of the 800 cycles per second signal curve. The envelope curves of the (—, T) signal were straight horizontal lines, the signal wave forms were good sine waves, and the tone was clear. The "envelope" (if it could be called that) for the (—, —) signal was erratic, containing an apparent jumble of low frequency waves. However, the 800 cycles per second signal wave form itself became at times a fairly good sine wave. The vocal announcement for this recording was always bad and for the 20-day playback it was barely intelligible. The announcements for other recordings were clear.

It has been ascertained that an ion generator yielding substantially equal numbers of positive and negative ions (beyond its grounded grid-like enclosure) gives the best reduction in tape noise. By inserting a variable direct current source in line 79 as indicated at 78 in FIGURE 21 and adjusting the direct current component to the ion generator's brush-discharge points, the ion output could be varied from predominantly negative to predominantly positive.

For unused ¼ mil Mylar roll-tape, proper ion generator adjustment results in about a 10 decibel reduction in tape noise if the tape is subjected to ions after passage over roll 16, FIGURE 1, and immediately wound onto a reel such as shown at 12 in FIGURE 1, whether or not the tape contacts any other part of the apparatus shown in FIGURE 1 prior to roll 16. Ions are particularly beneficial in reducing high frequency noise in unused roll tape. Electric prebias and bias treatment of unused roll tape (with zero signal) appears to be beneficial in reducing low frequency noise.

It is at present thought that while "post-head" ions are essential and perhaps sufficient, the supplementary use of "pre-head" ions during recording ensures better wave forms in the playback output.

Based on the observed motional currents in the external electrode circuits in the illustrated embodiments of the present invention, it is calculated that relatively enormous charge densities are deposited upon the tape. For example for a prebias electrode voltage of 900 volts, the area of the tape under the knife edge electrode and the area of the tape confronting the backing electrode receive charge densities of the order of at least 100 e.s.u. per square centimeter. By comparison, under normal circumstances, the surface of a dielectric can maintain a charge density of about 8 e.s.u. per square centimeter before the surrounding air breaks dawn and the charge is dissipated. There is every evidence that the charge deposited on the tape remains there rather than being dissipated, since tape voltages of the order hundreds of volts are readily measured after the pre-biasing step. It will be understood that a pre-biased tape as illustrated in FIGURE 5 is useful as an article of manufacture, since such a tape may be passed through recording electrodes at a later time without the use of any further pre-biasing step. By treating the pre-biased charged record tape with gaseous ions of polarity to neutralize the external field of the recorded charges in the tape, it is possible to store such a pre-biased tape for future use.

As illustrated in FIGURE 5, it is considered that the ions such as diagrammatically indicated at K are retained on the surfaces of the tape by electrostatic attraction to the internal charges adjacent the opposite surfaces of the record tape. These ions are believed to act as keepers tending to prevent the migration of the injected charges of opposite polarity toward each other through the thickness dimension of the tape. Further, when a charged tape such as indicated in FIGURE 5 or FIGURE 6 is wound in a reel, keepers applied to the external surfaces of the tape as illustrated in FIGURES 5 and 6 apparently act to prevent the recorded signal of one layer of tape from effecting a permanent alteration in the charge distribution of adjacent layers of tape. When charged tape is stored on a reel without the use of ions it is found that the tape becomes very noisy and the phenomenon of signal transfer between adjacent convolutions of the tape on the reel is observed. It is believed that the ions serve to neutralize the external fields of the internal recorded charges on the tape and produce a net reduction in the external electric field which might otherwise contribute to the transfer phenomenon.

In preserving a recorded signal on the tape such as illustrated in FIGURE 6, it is important not only to provide the ion keepers, but also to maintain the tape in a dry atmosphere such as is provided by storing the tape in a container which is relatively air tight and which is provided with a suitable desiccant for removing moisture from the air within the container. Desiccator storage of recorded tapes produced by the present invention has been found to greatly prolong the useful life of the records.

In addition to or as an alternative to the use of ion keepers when a record tape is wound on a reel, the margins of the tape may be provided with longitudinal ribs which tend to separate the adjacent layers of the tape and thus reduce the effective transfer fields between the successive layers of the tape on the reel. Such ribs preferably form a small part of the overall cross section of the tape and the ribs may project at the side of the tape away from the knife edge electrodes for the illustrated embodiments so that the ribs may pass freely between the wires of the backing electrode. Many other arrangements will readily occur to those skilled in the art for spacing the convolutions of a recorded tape wound on a reel, and for otherwise reducing the effective strength of the transfer fields. It may be noted referring to the charged record tapes of FIGURES 5 and 6 that by the use of excesses of positive and negative ions after the injection of the equal and opposite mutually bound charges, substantially all surface charges on the record medium will be neutralized. Further, if any excess of negative or positive charge is injected into the record medium, it appears that the ions are effective to withdraw such surplus charge, since such charge is not intensively bound within the tape by means of the corresponding charge of opposite polarity on the opposite side of the tape. In other words for such net or excess charge which is unbound, the ion treatment appears to be effective to neutralize or cancel such charge, so that effectively the resultant record medium has substantially equal quantities of charge of opposite polarity at directly opposite points through the thickness dimension of the record medium as illustrated in FIGURES 5 and 6.

Various experimental evidence indicates that noise may be eliminated from a tape during the manufacturing process either by ion treatment which may serve to remove unbound net charge such as indicated in FIGURE 7, or by rendering the tape interior conductive or of relatively less resistivity, for example by subjecting the tape to radiation or impregnating the tape with moisture.

REACTOR IRRADIATED TAPE

A roll of 1200 feet of 0.25 in. wide, 0.00025 in. Mylar tape wound on a 3 inch diameter, 0.5 in. wide polystyrene cylinder was given a $\gamma$-irradiation dosage of $1.09 \times 10^5$ roentgens from a cobalt-60 source. The irradiation consisted of approximately $10^5$R per hour for one hour, the dosage being measured with a ceric-sulfate dosimeter. Noise reduction of approximately 50 percent resulted.

A second irradiation of approximately the same strength, bringing the total dosage to $2.0 \times 10^5$R, also was made. No certain further reduction in noise was observed.

ELECTROSTATIC RECORDING EXPERIMENTS WITH MATERIALS OTHER THAN MYLAR

Recording experiments recently have been made with 0.00075 in. polyethylene, new 0.0005 in. cellulose acetate, and 0.0005" polystyrene tapes. Recordings, though inferior, were found possible with polyethylene and polystyrene, but no recording at all was obtained with the cellulose acetate. Threshold voltages comparable with that of 0.00025" Mylar were found for each of the tapes. It is believed that the new cellulose acetate tried has had too high a volume conductivity to provide a permanent type recording.

RECORDING WITH A SPACED FRONTAL OR BACKING ELECTRODE

Experiments have been carried out to determine the effect of spacing either the backing or frontal electrode from the tape during recording.

In one series of experiments, a circuit similar to that of FIGURE 14 was used. Capacitors 97 and 98 had values of .005 and .05 microfarad, respectively, and resistor 68 had a value of five megohms. In place of resistor 95, a resistance of 50 megohms was interposed between power supply 56 and the junction of resistor 68 and capacitor 98. A capacitor of .01 microfarad had one terminal connected to the juncture of the positive side of the power supply 56 and the adjacent terminal of the 50 megohm resistor, and the other terminal connected to ground. The connection between transformer 63 and ground was omitted, resistor 96 was omitted, electrode 21 was connected to ground, and lead 94 connected capacitor 61 directly to the juncture of resistor 68 and capacitor 98. Capacitor 61 had a value of 50 micromicrofarads. The power supply 56 had a direct current output voltage of 1620 volts to provide a voltage between electrodes 22 and 21 of about 1500 volts. A signal of about 90 volts r.m.s. and 800 cycles per second was available at the secondary 65 of transformer 63.

During recording successively greater spaces *a* and *b* were introduced at the extreme edges of the backing electrode between the backing electrode and the adjacent undersurface of the tape at the pre-bias and recording electrodes the backing electrode being cocked transversely of the tape path so that the successive wires thereof between the outside wires were spaced successive distances between the limit distances *a* and *b*. Recordings were all played back with *a* and *b* equal to zero, that is with each wire of the backing electrode contacting the tape at the pre-bias and record positions. The observed signal and noise playback voltages (in millivolts) are as follows:

| Gap (mils) | | Noise (mv.) | Signal (mv.) | Signal to noise ratio |
|---|---|---|---|---|
| a | b | | | |
| 0 | 0 | .78 | 24.5 | 31.4 |
| 0 | 1.3 | 1.0 | 20.8 | 20.8 |
| 0 | 2.6 | 1.2 | 19.8 | 16.5 |
| 1.3 | 3.9 | 1.4 | 13.7 | 9.7 |
| 2.6 | 5.2 | 1.5 | 4.8 | 3.2 |
| 3.9 | 6.5 | 1.5 | 1.3 | ---- |

On the basis of this and other experimental work, it is concluded that the electrode arrangements herein disclosed will provide stable recordings of high signal to noise ratio only if there is at least some physical contact between each electrode and the tape. Thus for simple electrode and tape guidance configurations, physical contact between the electrodes and the tape appears essential for electrostatic recording of analog type signals. On the other hand, the experimental findings indicate that electrode configurations giving substantially simultaneous equal and opposite charging of the opposite sides of a thin dielectric tape will provide charge injection records of substantial permanence even though one or more of the electrodes are spaced from the tape during recording. Such simultaneous equal and opposite charge recording with a spaced electrode is thus considered to have utility in less critical applications where the recorded tape is to be wound on reels after recording for subsequent reproduction or where the tape is to be repeatedly electrically reproduced and the like. One important application would be for storage of information in digital computers.

In the claims, the term "charge injection" refers to the transfer of volume charges to a tape or other record medium in such a way that the charges are stably bound to the tape and cannot be erased by wiping the tape, for example with a soft dielectric material such as tissue paper. The charge on the tape may reach values of hundreds of volts as measured by an electrometer and may be of the order of four to five volts as measured across playback electrodes such as shown at 188 and 189 in FIGURE 26 for suitably high playback load resistance.

It will be apparent that many modifications and variations may be effected without departing from the scope of the novel concepts of the present invention.

The present application is a continuation-in-part of my copending applications Serial No. 593,646, filed June 25, 1956 and now abandoned, Serial No. 729,369, filed April 18, 1958 and now abandoned and Serial No. 732,051, filed April 30, 1958 and now abandoned.

I claim as my invention:

1. The method of recording intelligence which comprises impelling gaseous ions of opposite polarity substantially simultaneously to respective directly opposite surface portions of a chemically stable light insensitive high resistivity dielectric record medium to inject charges of opposite polarity into subsurface regions of the record medium which are directly opposite each other and are separated by high resistivity portions of the record medium for intense mutual binding of the charges to the record medium, and controlling the injection of said charges of opposite polarity in accordance with the intelligence to be recorded on the record medium.

2. The method of recording intelligence which comprises impelling charges of opposite polarity to respective opposite surface portions of a chemically stable light insensitive high resistivity dielectric record medium to inject charges of opposite polarity into opposed subsurface regions of the record medium which are separated by high resistivity portions of the record medium for intense mutual binding of the charges to the record medium, controlling the injection of said charges in accordance with the intelligence to be recorded on the record medium, and subjecting the record medium to a quantity of gaseous ions sufficient to substantially neutralize the external fields produced by the recorded charges in the record medium prior to storage of the record medium for subsequent reproduction of the recorded intelligence, said ions having a substantially negligible affect on subsequent reproduction of the recorded information.

3. The method of recording intelligence which comprises impelling charges of opposite polarity to respective directly opposite surface portions of an electrostatic record medium with sufficient intensity to inject charges into opposed subsurface regions of the record medium, controlling the transfer of said charges to the record medium in accordance with the intelligence to be recorded on the record medium, subjecting the record medium to a quantity of gaseous ions sufficient to substantially neutralize the external field produced by the record charges in the record medium without deleteriously affecting subsequent reproduction of the information represented by the injected charges, and winding the record medium in a coil for storage without any substantial contacting of the record medium with foreign bodies between the ion treatment and the winding steps.

4. The method of recording intelligence which comprises impelling gaseous ions of opposite polarity to respective opposite surface portions of a chemically stable light insensitive high resistivity dielectric record medium to inject charges of opposite polarity in subsurface regions of the record medium which are directly opposite each other and are separated by high resistivity portions of the record medium for intense mutual binding of the charges to the record medium, controlling the transfer of said charges of opposite polarity in accordance with the intelligence to be recorded on the record medium, and storing the record medium with the intelligence recorded thereon in a dry atmosphere.

5. The method of recording intelligence which comprises injecting charges of opposite polarity into opposed subsurface region of a moving electrostatic record medium so as to be directly opposite each other and separated by a high resistivity portion of the record medium for intense mutual binding of the charges to the record medium, controlling the transfer of said charges in accordance with the intelligence to be recorded on the record medium, subjecting the record medium after the recording step to a quantity of gaseous ions sufficient to substantially neutralize the external field produced by the recorded charges in the record medium without deleteriously affecting subsequent reproduction of the information represented by said injected charges, and thereafter storing the record medium with the intelligence recorded thereon in a dry atmosphere prior to electrical reproduction of the recorded intelligence.

6. The method of recording intelligence which comprises subjecting a chemically stable light insensitive high resistivity dielectric record medium to electric fields above a threshold value for producing gaseous discharge at each of a pair of directly opposite surface portions of the record medium, whereby gaseous ions of opposite polarity are impelled substantially simultaneously to the respective directly opposite surface portions of the record medium, subsurface regions of the respective record medium surface portions receiving substantially simultaneously charges of opposite polarity which are substantially directly opposite each other through a dimension of the record medium to provide intense mutual binding of said charges of opposite polarity to the record medium, and controlling the charge transfer to the opposite surface portions of the record medium in accordance with the intelligence to be recorded on the record medium.

7. The method of recording intelligence which comprises injecting charges into opposed subsurface regions of a moving dielectric record medium which are intensely bound within the record medium by equal charges of opposite polarity separated from the injected charges by a path of high resistivity, controlling the charge injection in accordance with the intelligence to be recorded, and thereafter storing said medium with the intelligence recorded thereon in a desiccated atmosphere for reproduction after a substantial time delay.

8. The method of recording intelligence which comprises injecting charges into opposed subsurface regions of a moving dielectric record medium which are intensely bound within the record medium, controlling the charge injection in accordance with the intelligence to be recorded, and thereafter storing the medium with the intelligence recorded thereon disposed along sections of the record medium in a desiccated atmosphere substantially in contact with each other for subsequent electrical reproduction.

9. An electrostatic record member comprising a dielectric record medium having injected charges of opposite polarity in directly opposite subsurface regions thereof which are intensely bound to the record medium by virtue of their mutual electrostatic attraction, and keeper ions on the respective opposite surfaces of the record medium of polarity to neutralize the external field of the injected charges.

10. An electrostatic transducer system comprising reproducing means for receiving a record medium having a recorded signal in the form of charges of opposite polarity injected into respective opposite subsurface regions thereof, means for winding said record medium onto a reel after travel thereof past said reproducing means without erasure of the recorded signal, and means beyond said reproducing means for depositing charges on the surface of the record medium to inhibit signal transfer between adjacent convolutions of the record medium without deleteriously affecting subsequent reproduction of the information represented by said injected charges.

11. An electrostatic record assembly comprising a dielectric record medium having a signal recorded thereon in the form of charges of opposite polarity disposed in opposed subsurface regions of the record medium, said charges being mutually intensely bound to each other and separated by paths of high resistivity extending along a dimension through the record medium, the voltage across said dimension at portions of the record medium reaching levels of the order of 100 volts.

12. An electrostatic record assembly comprising an electrostatic record medium wound into a coil and having a signal recorded thereon in the form of charges of opposite polarity disposed in opposed subsurface regions thereof, mutually bound to the record medium and separated by a path of high resistivity, and ions on the medium of polarity and location to substantially reduce the stray field of said mutually bound charges to inhibit signal transfer between adjacent convolutions of said record medium.

13. An electrostatic record assembly comprising an electrostatic record medium wound into a coil and having a signal recorded thereon in the form of charges of opposite polarity disposed in opposed subsurface regions thereof, mutually bound to the record medium and separated by a path of high resistivity, ions on the surface of the medium of polarity and location to inhibit signal transfer between adjacent convolutions of said record medium, and a container for said record medium having a desiccant therein.

14. A device for electrostatically recording information on a dielectric recording medium, comprising a pair of spaced electrodes, means for moving the recording medium between said electrodes, and means connected to said electrodes for applying across the same a voltage representing the information to be recorded, said voltage being greater than a threshold voltage that produces an electric field between said electrodes of sufficient intensity to cause an abrupt rise in current flow in said electrodes when said recording medium is moving therebetween, but less than that required to cause breakdown of the recording medium, the electrodes being shaped and spatially positioned so that the medium is spaced from both electrodes adjacent the location of maximum field intensity between said electrodes to permit a gaseous discharge to take place on both sides of the recording medium adjacent the location of maximum field intensity between said electrodes, whereby charges are injected into subsurface regions of the medium.

15. A device for electrostatically recording information on a dielectric recording medium, comprising a pair of spaced apart, opposed electrodes, means for moving the recording medium between said electrodes and in contact therewith, means connected to said electrodes for applying across the same a voltage representing the information to be recorded, said voltage being greater than a threshold voltage that produces an electric field between said electrodes of sufficient intensity to cause an abrupt rise in current flow in said electrodes when said recording medium is moving therebetween, but less than that required to cause breakdown of the recording medium, the electrodes being shaped so that the medium is spaced from both electrodes adjacent the location where said medium contacts said electrodes to permit a gaseous discharge to take place on both sides of the recording medium adjacent the location of maximum field intensity between said electrodes, whereby charges are injected into opposed subsurface regions of the medium.

16. A device for electrostatically recording information on a dielectric recording medium, comprising a pair of spaced apart, opposed electrodes, means for moving the recording medium between said electrodes, and means connected to said electrodes for applying across the same a voltage representing the information to be recorded, said voltage being greater than a threshold voltage that produces an electric field between said electrodes of sufficient intensity to cause an abrupt rise in current flow in said electrodes when said recording medium is moving therebetween, but less than that required to cause breakdown of the recording medium, each electrode being shaped in a manner such that facing surfaces of the electrode and the record medium form a converging passageway leading to the position of maximum field intensity between said electrodes to permit a gaseous discharge to take place on both sides of the recording medium adjacent the location of maximum field intensity between said electrodes, whereby charges are injected into opposed subsurface regions of the medium.

17. A device for electrostatically recording information on an elongated dielectric recording medium, comprising a pair of spaced apart, opposed electrodes, means for longitudinally moving the recording medium between, and in contact with both of said electrodes, both of said electrodes having contact with the recording medium along lines transverse to the direction of travel of the recording medium and substantially opposite each other on the opposite sides of the recording medium, each electrode being shaped in a manner such that facing surfaces of the electrode and the record medium form a converging passageway leading to said line of contact, and means connected to said electrodes for applying across the same a voltage representing the information to be recorded, said voltage being greater than a threshold voltage that produces an electric field between said electrodes of sufficient intensity to cause an abrupt rise in current flow in said electrodes when the recording medium is moving therebetween, but less than that required to cause breakdown of the recording medium to permit a gaseous discharge to take place on both sides of the recording medium adjacent the location of maximum field intensity between said electrodes, whereby charges are injected into opposed subsurface regions of the medium.

18. A device for electrostatically recording a variable amplitude signal on a dielectric recording medium, comprising a pair of spaced apart, opposed electrodes, means for moving the recording medium between said electrodes and in contact therewith, means connected to said electrodes for applying across the same a variable signal voltage representing the signal to be recorded, and means for adding a biasing voltage to said signal voltage, said biasing voltage being sufficient to provide a total voltage across said electrodes greater than a threshold voltage that produces an electric field between said electrodes of sufficient intensity to cause an abrupt rise in current flow in said electrodes when said recording medium is moving therebetween, but less than that required to cause breakdown of the recording medium, each electrode being shaped in a manner such that facing surfaces of the electrode and the record medium form a converging passageway leading to, and a diverging passageway leading from the location where said medium contacts said electrodes to permit a gaseous discharge to take place on both sides of the recording medium adjacent the location of maximum field intensity between said electrodes, whereby charges are injected into opposed subsurface regions of the medium.

19. A recording device comprising a record member having charge storage regions of dielectric material adjacent directly opposite surfaces thereof, pre-biasing means for applying across said record member a pre-bias voltage exceeding a pre-bias threshold value where for said record member a characteristic abrupt rise in electrode current occurs during movement of said record member but less than the breakdown voltage of said record member, thereby injecting pre-biasing charges of opposite polarity into the respective charge storage regions of the record member, and recording means for injecting charges of opposite polarity from the pre-biasing charges into the respective charge storage regions of said record member in accordance with an intelligence to be recorded, said recording means applying across said member a recording voltage exceeding a threshold value where for said record member having said pre-biasing charges a characteristic abrupt rise in charging current to the record member occurs during movement of said record member but less than the breakdown voltage of said record member where sparkthrough of the record member begins.

20. A device for electrostatically recording information on a dielectric recording medium comprising a first pair of spaced, opposed electrodes, a second pair of spaced, opposed electrodes, means for moving the recording medium successively to said first pair and to said second pair of electrodes, means connected to said first pair of electrodes for applying across the same a pre-bias voltage greater than a threshold voltage that produces an electric field between said first pair of electrodes sufficient to cause an abrupt rise in current flow in said electrodes when said recording medium is moving therebetween, but less than that required to cause breakdown of the recording medium, and means connected to said second pair of electrodes for applying across the same a recording voltage representing the information to be recorded, said recording voltage being of opposite polarity to that of the prebias voltage and being greater than the threshold voltage of the prebiased medium but less than the breakdown voltage of the medium, the second pair of electrodes being shaped so that the medium is spaced from both of said second pair of electrodes immediately prior to passing through the position of maximum field intensity between said second pair of electrodes to permit a gaseous discharge to take place on both sides of the medium prior to the movement of said medium through a location of maximum electric field.

21. A signal recording device comprising spaced electrode means, means for passing a dielectric record member between and in contact with said spaced electrode means, and means for impressing a voltage across said electrode means which is a function of a signal to be recorded, said voltage being greater than a threshold value where for said dielectric record member a characteristic abrupt rise in electrode current occurs during movement of said record member, but less than the breakdown voltage of such record member where sparkthrough of the record member begins, said electrode means having multiple point contact with said record member along lines transverse to the direction of travel of the record member and substantially opposite each other on the opposite sides of the record member, whereby charges are injected into opposed subsurface regions of the medium.

22. A signal recording device comprising spaced electrode structures, a record member having charge storage regions of dielectric material adjacent directly opposite surfaces of the record member, means for moving said record member relative to said electrode structures with the electrode structures in engagement with the respective opposite surfaces of said record member, and means for impressing a voltage across said electrode structures which is a function of a signal to be recorded, said voltage being greater than a threshold value where for said record member a characteristic abrupt rise in electrode current occurs during movement of said record member but less than the breakdown voltage of said record member where sparkthrough of the record member begins, one of said electrode structures having portions thereof engaging said record member at points along a line transverse to the direction of travel of the record member with air gaps between the successive portions along said line, said portions being electrically connected together to serve as a single electrode unit, whereby charges are injected into said storage regions.

23. A signal recording device comprising spaced electrode structures, a record member having charge storage regions of dielectric material adjacent directly opposite surfaces of the record member, means for moving said record member relative to said electrode structures with said opposite surfaces of said record member in engagement with the respective electrode structures, and means for impressing a voltage across said electrode structures which is a function of a signal to be recorded, said voltage being greater than a threshold value where for said record member a characteristic abrupt rise in electrode current occurs during movement of said record member relative to said electrode structures but less than the breakdown voltage of said record member where spark-through of the record member begins, one of said electrode structures including a knife edge in contact with said member, the other of said electrodes having portions thereof arranged side by side transversely of the direction of movement of the record member with air gaps between adjacent portions, each portion having a surface which is rounded in the direction of travel of the record member and is rounded in the direction transversely of the direction of travel of the record member where said surface engages said record member, whereby charges are injected into said storage regions.

24. A variable amplitude signal recording system comprising a pair of spaced electrode structures, a dielectric record member having a portion thereof between said electrode structures, means for moving said record member relative to said electrode structures to bring successive portions of the record member between said electrode structures, means for impressing a variable signal voltage across said electrode structures which is a function of a variable amplitude signal to be recorded, a biasing voltage source, and means for adding the biasing voltage to said variable signal voltage, the total voltage exceeding a threshold value where for said record member a characteristic abrupt rise in electrode current occurs during movement of said record member, but less than the breakdown voltage of said record member where sparkthrough of the record member begins, said electrode structures each comprising electrode means having stable uniform electrical contact with said record member along lines transverse to the direction of travel of the record member and substantially opposite each other, one of said electrode means comprising a knife edge having an edge angle of substantially less than 90°, whereby charges are injected into opposite subsurface regions of said medium.

25. A transducer head for use with a moving dielectric record medium, comprising a pair of spaced frontal electrodes engaging one surface of the medium, means for connecting a D.C. voltage in series with said frontal electrodes, an electrically common backing electrode means engaging the other surface of said medium opposite both of said frontal electrodes, and means for connecting a source of a signal representing information to be recorded in series with said backing electrode means and one of said frontal electrodes.

26. A transducer head for use with a moving dielectric record medium, comprising a pair of spaced frontal electrodes engaging one surface of the medium, means for connecting a D.C. voltage in series with said frontal electrodes, an electrically common backing electrode means engaging the other surface of said medium opposite both of said frontal electrodes, means for connecting a source of a signal representing information to be recorded in series with said backing electrode means and one of said frontal electrodes, and means for spacing said medium from said backing electrode intermediate said frontal electrodes.

27. A transducer head for use with a moving dielectric record medium, comprising a pair of spaced frontal electrodes, each having a knife edge for engaging a single surface of the record medium, means for connecting a D.C. voltage in series with said frontal electrodes, an electrically common backing electrode means having a rounded surface which engages the medium opposite both frontal electrodes, means for connecting a source of a signal representing information to be recorded in series with said backing electrode means and one of said frontal electrodes.

28. A transducer head for use with a moving dielectric record medium, comprising a pair of spaced frontal electrodes engaging one surface of the medium, means for connecting a D.C. voltage in series with said frontal electrodes, an electrically common backing electrode means engaging the other surface of said medium opposite both frontal electrodes, means for connecting a source of a signal representing information to be recorded in series with said backing electrode means and one of said frontal electrodes, and a grounded shield disposed intermediate said frontal electrodes to minimize coupling therebetween.

29. A transducer head for use with a moving dielectric record medium, comprising a pair of spaced frontal electrodes engaging one surface of the medium, at least one of said frontal electrodes being made of semiconductor material, means for connecting a D.C. voltage in series with said frontal electrodes, a common backing electrode engaging the other surface of said medium opposite said frontal electrodes, means for connecting a source of a signal representing information to be recorded in series, with said backing electrode and one of said frontal electrodes, means for spacing said medium from said backing electrode intermediate said frontal electrodes, and a grounded shield disposed intermediate said frontal electrodes.

30. In a recording head, a pair of electrodes each having a knife edge spaced from the other for engaging a single surface of a record medium, means for connecting a D.-C. voltage in series with said electrodes, a third electrode comprising a plurality of individually deflectable wires each extending transversely to said knife edges for engaging the opposite surface of the record medium to press the record medium against said knife edges at multiple points along each of said knife edges, and means for connecting a source of a signal representing information to be recorded in series with said third electrode and one of said pair of electrodes.

31. In a recording apparatus having means for moving a record medium, means for injecting electrical charges into the record medium comprising a pair of spaced knife edges for engaging one surface of the record medium, means for connecting a D.-C. voltage in series with said knife edges, a common backing electrode means having engagement with the opposite surface of the record medium to press the record medium against each of said knife edges, means for connecting a source of a signal representing information to be recorded in series with said backing electrode means and one of said frontal electrodes, and at least one guide disposed adjacent to said knife edges and having a pair of confronting shoulders for receiving the record medium therebetween to constrain the opposite lateral edges thereof as it travels across said knife edges.

32. In a recording apparatus having means for moving a record medium, means for injecting electrical charges into the record medium comprising a pair of spaced knife edges for engaging one surface of the record medium, means for connecting a D.-C. voltage in series with said knife edges, a common backing electrode means having engagement with the opposite surface of the record medium to press the record medium against each of said knife edges, means for connecting a source of a signal representing information to be recorded in series with said backing electrode means and one of said frontal electrodes, guide means disposed adjacent to at least one of said knife edges for constraining transverse movement of said medium as it travels across said knife edges, and means for spacing said medium from said backing electrode means intermediate said knife edges.

33. In a recording apparatus having means for moving a record medium, the combination comprising a pair of spaced knife edges for engaging one surface of the record medium, means for connecting a D.-C. voltage in series with said knife edges, a common backing electrode means having engagement with the opposite surface of the record medium to press the record medium against each of said knife edges, means for connecting a source of a signal representing information to be recorded in series with said backing electrode means and one of said frontal electrodes, and at least one guide means disposed between said knife edges for receiving the record medium, said guide means being supported in spaced relation to said backing electrode so as to space the record medium from the portion of said backing electrode between said knife edges.

34. A recording apparatus having a recording head, and means for moving a record medium past the head, said head comprising a pair of spaced, opposed electrodes for establishing a charge injection field for injecting charges into opposed subsurface regions of the record medium traveling between said electrodes, one of said electrodes including a knife edge for engaging one surface of the record medium, and the other of said electrodes including a plurality of wires extending transversely to said knife edge for engaging the opposite surface of the record medium and pressing the record medium against said knife edge, said wires having a smaller diameter than about .001".

35. A recording apparatus having a recording head, and means for moving a record medium past the head, said head comprising a pair of spaced opposed electrodes for establishing a charge injection field for injecting charges into the record medium traveling between said electrodes, one of said electrodes including a knife edge for engaging one surface of the record medium, said knife edge having a radius less than .0005", the other of said electrodes including a plurality of wires extending transversely to said knife edge for engaging the opposite surface of the record medium and pressing the record medium against said knife edge.

36. A recording apparatus having a recording head, and means for moving a record medium past the head, said head including a pair of spaced, opposed electrodes for establishing a charge injection field for injecting charges into the record medium traveling between said electrodes, one of said electrodes including a pair of convergent, lapped surfaces which form a knife edge for engaging one surface of the record medium, said knife edge being chromium plated, the other of said electrodes including a plurality of wires extending transversely to said knife edge for engaging the opposite surface of the record medium and pressing the record medium against said knife edge.

37. A recording apparatus having a recording head, and means for moving a record medium past the head, said head comprising a pair of spaced, opposed electrodes for establishing a charge injection field for injecting charges into the record medium traveling between said electrodes, one of said electrodes including a knife edge for engaging one surface of the record medium, said knife edge being formed of $Ni_{0.4}Zn_{0.6}Fe_2O_4$, the other electrode including a plurality of wires extending transversely to said knife edge for engaging the opposite surface of the record medium and pressing the record medium against said knife edge.

38. A recording apparatus having a recording head and means for moving a record medium past the head, said head comprising a pair of spaced, opposed electrodes for establishing a charge injection field of injecting charges into the record medium traveling between said electrodes, one of said electrodes including a knife edge for engaging one surface of the record medium, the other electrode including a plurality of wires of ferromagnetic material extending transversely to said knife edge for engaging the opposite surface of the record medium and pressing the record medium against said knife edge, and means for establishing a magnetic pole at said edge, whereby the wires are attracted to said knife edge.

39. Apparatus for injecting charges into a record medium including a pre-bias electrode arranged at one side of the medium to first inject a direct current prebias charge into opposed subsurface regions of the medium, a record electrode arranged to thereafter alter the injected pre-bias charge in accordance with a signal to be recorded, a common backing electrode arranged to cooperate with both of said pre-bias and record electrodes on the opposite side of the medium, and means for adjusting said common backing electrode with respect to the other electrodes to differentially alter the cooperation therewith.

40. A system for electrostatically recording information on a moving dielectric tape, comprising a pre-bias and a record electrode engaging one surface of the record medium, electrically common backing electrode means engaging the other surface of said medium and pressing the same against said pre-bias and record electrodes, a D.-C. voltage source, means connecting said source in series with said record electrode, said pre-bias electrode, and said backing electrode, a source of information to be recorded, a capacitor, and means connecting said signal source, said capacitor, said record and said backing electrodes in series, whereby the potential between said record and said backing electrode is varied in accordance with the signal to be recorded.

41. In a recording apparatus, a recording head including a pair of spaced opposed electrodes for establishing a charge injection field for injecting charges into opposed subsurface regions of a dielectric record medium traveling between said electrodes, and means disposed after said injecting means for pulling the record medium past said electrodes, said moving means including a drive roller, and a pinch roller normally pressing said medium against said drive roller, each of said rollers being made of a conductive material whereby charges deposited on the surface of said rollers by said medium are conducted away from the surface.

42. An electrostatic transducer system comprising means for injecting charges into a subsurface region of a moving dielectric record medium, and means for subsequently subjecting the charged record medium to cloud of ions whereby ions are deposited on the surface of the record medium which tend to neutralize the external field of said injected charges without substantially affecting the quantity of said injected charges in the medium.

43. A device for electrostatically recording information on a moving dielectric recording medium, comprising means for injecting charges into a subsurface region of the recording medium, means associated with said injecting means for varying the charges injected into the medium in accordance with the information being recorded, means for subsequently depositing charges on the surface of the medium, thereby neutralizing the external field of said injected charges without deleteriously affecting subsequent reproduction of the information represented by said injected charges.

44. A device for electrostatically recording information on a moving dielectric recording medium, comprising means for injecting particles of one polarity into one subsurface region of said medium and for simultaneously injecting equal charges of the opposite polarity into the oppositely disposed subsurface region of said medium, means associated with said injecting means for varying the charges injected into the medium in accordance with the information being recorded, and means for subsequently subjecting said medium to a cloud of ions of both polarities, whereby ions are deposited on the surface of the record medium which tend to neutralize the external field of said injected charges without deleteriously affecting subsequent reproduction of the information represented by said injected charges.

45. A device for electrostatically recording information on a moving dielectric recording medium, comprising means for applying surface charges to the medium, means for subsequently injecting charges into a subsurface region of the recording medium, means associated with said injecting means for varying the charges injected into the medium in accordance with the information being recorded, and means for depositing charges on the surface of said medium after travel thereof past said injecting means without deleteriously affecting subsequent reproduction of the information represented by said injected charges.

46. A device for electrostatically recording information on a dielectric recording medium, comprising means for subjecting said medium to ions of both polarities, means for subsequently injecting charges of one polarity into one subsurface region of said medium and for simultaneously injecting equal charges of opposite polarity into the oppositely disposed subsurface region, means associated with said injecting means for varying the charges injected into the medium in accordance with the information being recorded, and means for subjecting said medium to a cloud of ions of both polarities after travel thereof past said injecting means, said ions being deposited on the surface of the medium without deleteriously affecting subsequent reproduction of the information represented by said injected charges.

47. An electrostatic record member comprising a dielectric record medium having charges of one polarity in a subsurface region thereof and equal charges of opposite polarity in an oppositely disposed subsurface region thereof, the subsurface regions being separated from each other.

48. An electrostatic record member comprising a dielectric record medium having injected charges of one polarity in a subsurface region thereof, and keeper charges of opposite polarity on the surface of said medium adjacent said subsurface region.

49. An electrostatic record comprising a record member having charge storage regions of dielectric material adjacent directly opposite surfaces of the record member, said record member having discrete charges distributed along each of said charge storage regions in accordance with an intelligence signal, the charges at directly opposite points in the respective charge storage regions being of substantially equal magnitude and opposite polarity for intense mutual binding of the charges to the record member.

50. An electrostatic record for electrical reproduction in an electronic playback apparatus comprising a record member having charge storage regions of dielectric material adjacent directly opposite surfaces of the record member, said surfaces being separated by a distance of the order of 1/4 mil, said record member having discrete charges distributed along each of said charge storage regions in accordance with the time variations of a variable amplitude intelligence signal, and the charges at directly opposite points in the respective charge storage regions being of substantially equal magnitude and opposite polarity for intense mutual binding of the charges to the record member.

51. An electrostatic sound record for electrical reproduction by sound playback apparatus comprising a polyester tape record member of thickness of the order of ¼ mil, said record member having discrete charges distributed along subsurface regions thereof in accordance with a sound signal, the charges at directly opposite points through the thickness dimension of the tape record member being of substantially equal magnitude and opposite polarity for intense mutual binding of the charges to the record member.

52. A method of recording information which comprises injecting charges of one polarity into one subsurface region of a moving dielectric record medium, substantially simultaneously therewith injecting equal charges of opposite polarity into the directly opposite subsurface region of said medium, and controlling the charge injection in accordance with the information to be recorded.

53. A method of recording information which comprises depositing charges of one polarity on one surface of a moving dielectric record medium, substantially simultaneously therewith depositing equal charges of opposite polarity on the opposite surface of the medium, and thereafter subjecting said medium to an intense field which is of sufficient intensity to drive said charges into subsurface regions of said record medium and controlling the deposit of charges and the strength of the field in accordance with the information being recorded.

54. A method of recording which comprises subjecting a moving dielectric record medium to a first D.-C. field of such potential as to cause a current flow of electric charges across the surface barrier of the medium and to be bound within the interior of the medium, and thereafter subjecting the medium to a second D.-C. field of identical current and opposite polarity to said first D.-C. field, and superimposing on said second D.-C. field a field which varies in accordance with the information to be recorded on said medium.

55. A method of recording information which comprises superimposing a plurality of moving dielectric record mediums so that the mediums are in contact with each other, injecting charges of opposite polarity into the outer surfaces of the plurality of record mediums, whereby charges are injected into opposed subsurface regions of the respective record mediums, varying the application of charges to said record mediums in accordance with said intelligence, and thereafter separating the record mediums to provide a plurality of separate record mediums each having said information recorded thereon.

56. A method of recording information which comprises injecting charges of opposite polarity into opposed subsurface regions of a moving multilayer dielectric body, varying the application of charges in accordance with said intelligence, and thereafter separating said body into separate layers to provide a plurality of records each having said information recorded thereon.

57. A method of recording information which comprises injecting charges into a moving dielectric record medium controlling the charge injection in accordance with the intelligence to be recorded, and thereafter subjecting said medium to a cloud of charges whereby charges of opposite polarity to the injected charges are deposited at a position on the surface of the medium relatively near said injected charges thereby stabilizing the position of said injected charges in said medium without deleteriously affecting subsequent reproduction of the information represented by said injected charges.

58. A method of recording information which comprises producing electric fields having origins at directly opposite sides of a record member of dielectric material, having characteristics in accordance with the information to be recorded and of intensity exceeding a threshold intensity where charge transfer to the record member begins to exhibit a characteristic rise and having a configuration to inject a charge of one polarity into a subsurface region at one side of the record member and a charge of opposite polarity into an opposite subsurface region of the record member which last mentioned region is closely adjacent the first mentioned region in a direction through the record member for establishing intense mutual attraction and consequent binding of the charges of opposite polarity to the record member, and thereafter subjecting the record member to a cloud of ions of both polarities, whereby ions are deposited on the surface of the medium which tend to neutralize the external field of the charges in the medium without deleteriously affecting subsequent reproduction of the information represented by said injected charges.

59. A device for electrostatically recording information on a dielectric recording medium, comprising a pair of spaced electrodes, means for moving the recording medium between said electrodes, means connected to said electrodes for applying across the same a voltage representing the information to be recorded, a source of biasing voltage and means for adding the biasing voltage to the information representing voltage, the biasing voltage being such that the total voltage applied across said electrodes is greater than a threshold voltage that produces an electric field between said electrodes of sufficient intensity to cause an abrupt rise in current flow in said electrodes when said recording medium is moving therebetween, but less than that required to cause breakdown of the recording medium, the electrodes being shaped and spatially positioned so that the medium is spaced from both electrodes adjacent the location of maximum field intensity between said electrodes to permit a gaseous discharge to take place on both sides of the recording medium adjacent the location of maximum field intensity between said electrodes, whereby charges are injected into opposed subsurface regions of said medium.

60. A recording system comprising a record member having regions on respective opposite sides thereof for storing information in the form of electric charge patterns, a pair of electrodes disposed on the respective sides of the record member adjacent the respective regions of the record member which are to receive the recorded information and providing a relatively negligible transfer of charge to the record member when the record member is between said electrodes and voltages less than a threshold value are applied to said electrodes but providing a characteristic rising charge transfer to the record member as a function of voltage applied to said electrodes for values of applied voltage in a range greater than said threshold value, biasing means for providing an output voltage above said threshold value, said biasing means being electrically connected to said electrodes so as to produce a charge transfer substantially greater than said relatively negligible charge transfer from each of the electrodes to the adjacent side of said record member, the side of the record member adjacent the electrode having a positive polarity receiving a net positive discrete charge and the side of the record member adjacent the electrode having a negative polarity receiving a net negative discrete charge, and means coupled to said electrodes for controlling the charge transfer in accordance with the information to be recorded, said record member being of a dielectric material at the regions thereof receiving said discrete positive and negative charges.

61. A recording system comprising a record member of dielectric material for storing information in the form of electric charge patterns, a pair of electrodes disposed on the respective opposite sides of the record member and providing a relatively negligible transfer of charge to the record member when the record member is between said electrodes and voltages less than a threshold value are applied to said electrodes but providing a characteristic rising charge transfer to the record member as a function of voltage applied to said electrodes for values of applied voltage in a range greater than said threshold value, and means for recording information in the form of electric charge patterns on the record member including biasing means for providing a voltage above said threshold value between said electrodes, said biasing means being electrically connected to said electrodes so as to produce a charge transfer substantially greater than said relatively negligible charge transfer from each of the electrodes to the adjacent side of said record member and to transfer substantially equal and opposite charges substantially simultaneously to directly opposite sides of said record member to provide an intense electric field therebetween tending to bind the charges to the record member, and means coupled to said electrodes for controlling the charge transfer in accordance with the information to be recorded.

62. A recording system comprising a record member for storing information in the form of electric charge patterns, a pair of electrodes disposed on the respective opposite sides of the record member providing a relatively negligible transfer of charge to the record member when the record member is between said electrodes and voltages less than a threshold value are applied to said electrodes and providing a characteristic rising charge transfer to the record member as a function of voltage applied to said electrodes for values of applied voltage in a range greater than said threshold value, and means for recording information in the form of electric charge patterns on the record member including a voltage source having an output voltage above said threshold value electrically connected to said electrodes so as to produce a charge transfer substantially greater than said relatively negligible charge transfer from each of the electrodes to the adjacent side of said record member and to transfer substantially equal and opposite charges substantially simultaneously to directly opposite sides of said record member to provide an intense electric field therebetween tending to bind the charges to the record member, and means connected to said electrodes for applying across the same a signal voltage representing the information to be recorded, the sum of said source voltage and said signal voltage always being greater than said threshold voltage.

63. A recording device comprising a record member having charge storage regions of dielectric material adjacent the surface thereof, biasing means for applying across said record member a voltage above a threshold voltage where for said record member a characteristic abrupt rise in charge current to the record member occurs during relative movement of said record member, but less than a breakdown voltage of said record member where sparkthrough of the record member begins, whereby charges are injected into said charge storage regions, and recording means for controlling the charge current in accordance with the information to be recorded.

References Cited in the file of this patent

UNITED STATES PATENTS

| | | |
|---|---|---|
| 1,782,712 | Chapman | Nov. 25, 1930 |
| 2,080,066 | Sheppard et al. | May 11, 1937 |
| 2,225,323 | Severy | Dec. 17, 1940 |
| 2,278,295 | Wilson | Mar. 31, 1942 |
| 2,698,928 | Pulvari | Jan. 4, 1955 |
| 2,872,529 | Hollmann et al. | Feb. 3, 1959 |
| 2,921,795 | Young | Jan. 19, 1960 |
| 2,976,354 | Banning | Mar. 21, 1961 |
| 3,040,124 | Camras | June 19, 1962 |

FOREIGN PATENTS

| | | |
|---|---|---|
| 1,055,048 | France | Oct. 14, 1953 |

OTHER REFERENCES

Heynick: Permanent Writing Cathode Ray Recorder "Electronics," April 1956, pages 148 and 149.

UNITED STATES PATENT OFFICE

CERTIFICATE OF CORRECTION

Patent No. 3,159,718 December 1, 1964

Donald E. Richardson

It is hereby certified that error appears in the above numbered patent requiring correction and that the said Letters Patent should read as corrected below.

Column 1, line 17, for "no" read -- on --; line 37, for "rapidly," read -- rapidly. --; column 2, line 63, for "barried" read -- barrier --; column 7, line 11, for "cross" read -- across --; column 13, line 5, for "charges" read -- charge --; column 35, line 4, beginning with "8. The method" strike out all to and including "electrical reproduction." in lines 12 and 13, same column 35, and insert the following:

8. The method of recording intelligence which comprises injecting charges into opposed subsurface regions of a moving dielectric record medium which are intensely bound within the record medium, controlling the charge injection in accordance with the intelligence to be recorded, and thereafter storing the medium in a desiccated atmosphere with the intelligence recorded thereon disposed along sections of the record medium substantially in contact with each other for subsequent electrical reproduction.

Signed and sealed this 22nd day of June 1965.

(SEAL)
Attest:

ERNEST W. SWIDER
Attesting Officer

EDWARD J. BRENNER
Commissioner of Patents